United States Patent
Devarajan et al.

(10) Patent No.: US 7,492,364 B2
(45) Date of Patent: Feb. 17, 2009

(54) SYSTEM AND METHOD FOR CREATING AND UPDATING A THREE-DIMENSIONAL MODEL AND CREATING A RELATED NEUTRAL FILE FORMAT

(75) Inventors: Venkat Devarajan, Arlington, TX (US); Raj Ganesan Iyer, Sterling Heights, MI (US); Sharon Barber, Arlington, TX (US); Niranjan Dharmarajan, Bellevue, WA (US); Savitha Ganapathi, Arlington, TX (US); Navaneetha Krishnan Subramanian, Arlington, TX (US); Vijayajeevan Jothi Nana, Arlington, TX (US); Saurabh Maitra, Arlington, TX (US); Ashley Scott Williams, Fort Worth, TX (US)

(73) Assignee: Imagecom, Inc., Arlington, TX (US)

( * ) Notice: Subject to any disclaimer, the term of this patent is extended or adjusted under 35 U.S.C. 154(b) by 0 days.

(21) Appl. No.: 10/626,494

(22) Filed: Jul. 23, 2003

(65) Prior Publication Data

US 2004/0153824 A1 Aug. 5, 2004

Related U.S. Application Data

(60) Provisional application No. 60/397,902, filed on Jul. 23, 2002, provisional application No. 60/397,903, filed on Jul. 23, 2002, provisional application No. 60/397,965, filed on Jul. 23, 2002.

(51) Int. Cl.
G06T 17/00 (2006.01)
G06T 15/00 (2006.01)

(52) U.S. Cl. ............... 345/420; 345/419

(58) Field of Classification Search ............. None
See application file for complete search history.

(56) References Cited

U.S. PATENT DOCUMENTS

| | | | | |
|---|---|---|---|---|
| 5,970,490 A * | 10/1999 | Morgenstern | ........... | 707/10 |
| 6,212,441 B1 * | 4/2001 | Hazama et al. | ........... | 700/98 |
| 6,295,513 B1 * | 9/2001 | Thackston | ........... | 703/1 |
| 6,614,430 B1 * | 9/2003 | Rappoport | ........... | 345/420 |
| 6,629,065 B1 * | 9/2003 | Gadh et al. | ........... | 703/1 |
| 7,149,677 B2 * | 12/2006 | Jayaram et al. | ........... | 703/22 |

OTHER PUBLICATIONS

Nell Dale, "C++ Plus Data Structures", Jones and Bartlett Publishers, 1999, pp. 344, 345, and 361-366.*

Ganesan, R. and Devarajan, V., "Intersecting features extraction from 2 D orthographic projections" Computer Aided Design, vol. 30, num 11, pp. 863-873, 1998.*

S.S.P.Shum, W.S.Lau, M.M.F.Yuen and K.M.Yu. Solida Reconstruction from Orthographic Views using 2-Stage Extrusion. Computer-Aided Design 33(1), 91-102, 2001.*

(Continued)

*Primary Examiner*—Ulka Chauhan
*Assistant Examiner*—Daniel F Hajnik
(74) *Attorney, Agent, or Firm*—Jackson Walker L.L.P.

(57) ABSTRACT

The present invention discloses a method for building, defining, and storing features in an application neutral format comprising building a feature based on a feature class, wherein the feature class comprises feature geometry, feature constraints, and feature dimensions, defining the built feature as a geometric representation of an individual feature type, and storing the representation in a binary file format.

9 Claims, 16 Drawing Sheets

OTHER PUBLICATIONS

Ganesan R et al., (1994) "FlexiCAD: An Architecture for Integrated Product Modeling and Manfacture by Features." Proceedings of the Fourth International Conference on Computer Integrated Manufacturing and Automation Technology, Troy, NY, USA, 10-12 pp. 60-65, XP010133370 Los Alamitos, CA, USA, IEEE Comput. Soc. Press.

Shah J J et al., (1991) Experimental Investigation of the Step Form-Feature Information Model: Computer Aided Design, Elsevier Publishers BV., Barking, GB bol. 23, No. 4 May 1, 1991 pp. 282-296, XP000209697 ISSN: 001-4485.

XP002276034 "IGES 4.0 to BRL-CAD Translator for CGS Models" Internet, 'Online! Sep. 2, 1998, . Retreived from Internet: <URL: Http://Ftp.arl.mil/reports/arl-tr-315/iges.html> retrieved on Apr. 5, 2004.

XP002276035 "binary DXF File Format" Internet, 'Online! Mar. 30, 1999, Retrieved from the Internet: <URL:http://www.autodesk.com/techpubs/autocad/acadr14/dxf/binary_dxf_file_format_al_u05_b.htm> retrieved on Apr. 5, 2004.

Ganesan R et al., (1994) "FlexiCAD: An Architecture for Integrated Product Modeling and Manfacture by Features." Proceedings of the Fourth International Conference on Computer Integrated Manufacturing and Automation Technology, Troy, NY, USA, 10-12 pp. 60-65, Los Alamitos, CA, USA, IEEE Comput. Soc. Press. XP010133370.

Coppieters K: "A Cross-Platform Binary Diff" Dr. DoBS Journal, RedWood City, CA, US May 1995, pp. 32, 35-36, XP000601152.

Ganesan RL Automated Recognition of Intersecting Features from 2-D CAD for Collaborative Virtual Prototyping Dissertation, Dec. 1997. XP001202169.

XP002276035 "Binary DXF File Format" Internet, 'Online! Mar. 30, 1999, Retrieved from the Internet: <URL:http://www.autodesk.com/techpubs/autocad/acadr14/dxf/binary_dxf_file_format_al_u05_b.htm> retrieved on Apr. 5, 2004.

Ramanathan Balachander: "MSc Thesis: Form Feature Extraction From 2-D orthographic Views," May 1994 The University of Texas At Arlington, XP002308966.

Meeran S et al., "Automated Feature Recognition From 2-D Drawings" Computer Aided Design, Elsevier Publishers VV., Barking, GB vol. 25. No. 1, Jan. 1993, pp. 7-17 ISSN: 0010-44485, XP000330559.

Ganesan R et al., "A Feature-Based Framework for Transforming and Representing Multiple Format CAD for Virtual Prototyping" Proceedings of the Workshops on Virtual Environments and Their Applications and Virtual Prototyping, Aug. 1995 pp. 129-145, XP008032905.

Sundaramurthy V "Reconstruction of 3D CAD Models From 2-D Orthographic CAD views" International Conference on CAD, CAM Robotics and Automous Factories, Oct. 1994 pp. 71-80, XP002916179.

International Search Report, International Application No. PCT/US 03/23059, Dec. 17, 2004.

* cited by examiner

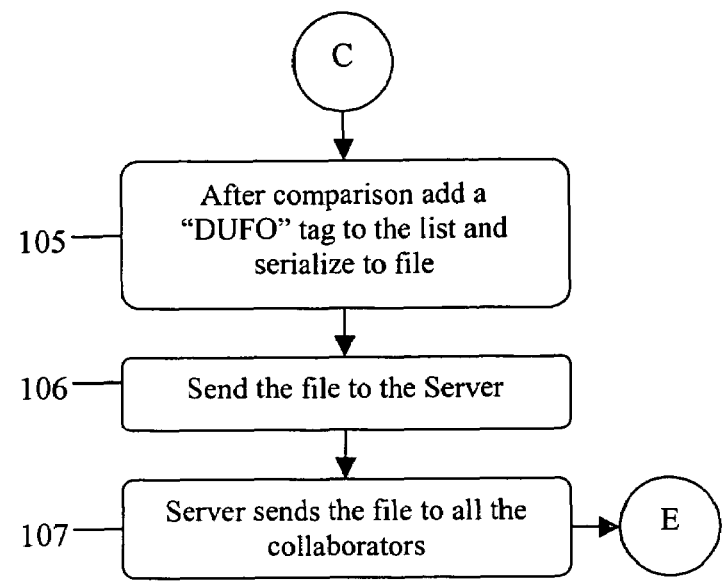
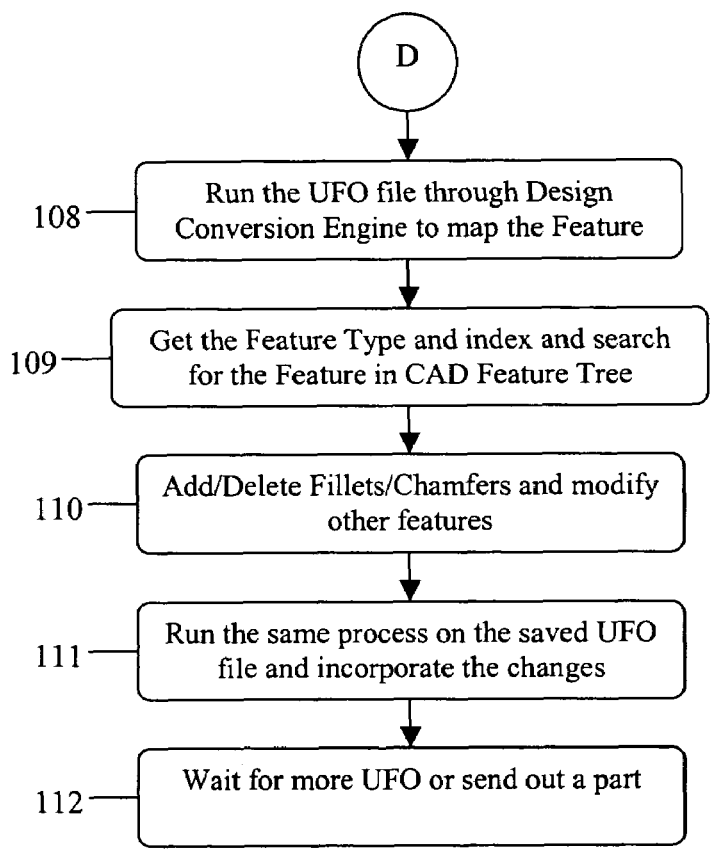
Fig. 2b (cont.)

SYSTEM AND METHOD FOR CREATING AND UPDATING A THREE-DIMENSIONAL MODEL AND CREATING A RELATED NEUTRAL FILE FORMAT

CROSS REFERENCE TO RELATED APPLICATIONS

The present application is related to and claims the benefit of U.S. Provisional Patent Application No. 60/397,902, filed Jul. 23, 2002, entitled METHODOLOGY FOR INCREMENTALLY UPDATING 3D FEATURE-BASED CAD MODELS IN A COLLABORATIVE ENVIRONMENT, U.S. Provisional Patent Application No. 60/397,903, filed Jul. 23, 2002, entitled METHODOLOGY FOR AUTOMATED CONVERSION OF 2D CAD DRAWINGS TO PARAMETRIC 3D CAD MODELS, and U.S. Provisional Patent Application No. 60/397,965, filed Jul. 23, 2002, entitled UNIVERSAL FEATURE OBJECT—A METHODOLOGY TO STORE FEATURES IN A CAD NEUTRAL FORMAT. Applicants hereby claim the benefit of these Provisional patent applications under 35 U.S.C. Section 119(e), the entire contents of which are incorporated by reference herein.

FIELD OF THE INVENTION

The present invention relates to a system and method for converting a two-dimensional (2D) drawing to a three-dimensional (3D) model and, more particularly, to a system and method for creating and updating a 3D model and creating a related neutral file format.

BACKGROUND OF THE INVENTION

There have been various attempts to create an intermediate file format for the exchange of feature data or graphical information between systems (such as Computer Aided Design (CAD) systems) and products. A native file format is typically associated with each CAD system, some of which are complex, do not always translate accurately to other CAD systems, and only transfer graphical information. Therefore, there is a need overcome such limitations and to create an intermediate file format that can represent a feature-based 3D model as well as a simple representation of the graphical information for use in multiple applications.

Several companies offer some version of homogeneous collaboration within their products. Such functionality allows users to share models in the native format of the CAD system for design changes. In the homogeneous environment, several conventional techniques are used today. These include using streaming technology to stream large size models between users, redlining and markup using viewers that do not display intelligence in the model (such as features and their associated parameters), or propagating design commands to users. A limitation of such conventional products, however, is the lack of collaboration in a heterogeneous CAD environment.

In order to currently achieve true collaboration between designers, an entire model is transferred between users in real-time. Such a procedure can be very inefficient and slow for large CAD models and assemblies. Hence, there is a further need for a methodology that will propagate only design changes to the collaborators that are concise and easily deliverable over various networks (such as, for example, narrowband networks). This obviates the transfer of entire models between users or manually recreating the design changes at each collaboration node.

Companies have traditionally accumulated large amounts of legacy data as 2D drawings and most new designs are currently modifications to legacy designs that are only available in 2D drawings. Certain conventional solutions can semi-automatically convert simple 2D drawings to 3D models. However, the 3D models generated by these systems are "dumb" geometric models that cannot be edited easily. Certain products available for 2D to 3D conversion create 3D solid models of simple prismatic parts within software that is automated only for the simplest of parts with other more complex parts having to be interactively modeled. Other products also convert simple drawings to 3D models using an intuitive modeling approach whose generated models are not true parametric models. As such, they lack constraints and dimensions and do not represent design intent well. Other products create 3D solid models using a completely manual approach. Although these 3D models are parametric and feature-based, the class of features handled is typically limited to extrusion joins and cuts.

As such, what is also need is a system and method for easily and cost effectively converting 2D drawings to usable 3D models, and generating intelligent 3D parametric and feature-based models. These improvements would allow designers to easily modify the models in the CAD system of their choice. There is also a need to convert older designs to 3D models to for archiving purposes or to manufacture spare parts when users or systems cannot use the 2D data.

It is therefore desirable for the present invention to overcome the limitations and problems described above that are involved with creating and updating a 3D model and creating a related neutral file format.

SUMMARY OF THE INVENTION

The present invention achieves technical advantages as a system and method for creating and updating a 3D model and creating a related neutral file format.

In one embodiment, a method for building, defining, and storing features in an application neutral format comprises building a feature based on a feature class, wherein the feature class comprises feature geometry, feature constraints, and feature dimensions, defining the built feature as a geometric representation of an individual feature type, and storing the representation in a binary file format.

In another embodiment, a method for incrementally updating a binary file comprises indicating changed features between a first binary file and a second binary file at a first client, receiving the changed features at a second client, comparing an identification of the first binary file with the second binary file, and if the identification is new, writing the second binary file to the first binary file.

In a further embodiment, a method for converting a two-dimensional drawing to a three-dimensional model (or object) comprises detecting the two-dimensional drawing, correcting errors associated with the two-dimensional drawing, receiving the corrected drawing by an automated feature detection system, performing a profile analysis and a feature analysis, producing a list of three-dimensional features, and writing the features to a binary file format.

DETAILED DESCRIPTION OF THE INVENTION

Universal Feature Object (UFO)—A Methodology to Store Features in a CAD Neutral Format The present invention (which may be implemented as software, hardware, and/or a combination of software and hardware) includes a neutral file format that is capable of handling graphical representations of a 2D drawing and fully constrained feature-based 3D models from multiple CAD systems. This neutral or generic intermediate file format allows for the conversion of 2D legacy drawings to 3D feature-based models in a targeted CAD system and also allows for the collaborative update of a 3D model from one CAD system to another.

Figure 1A:
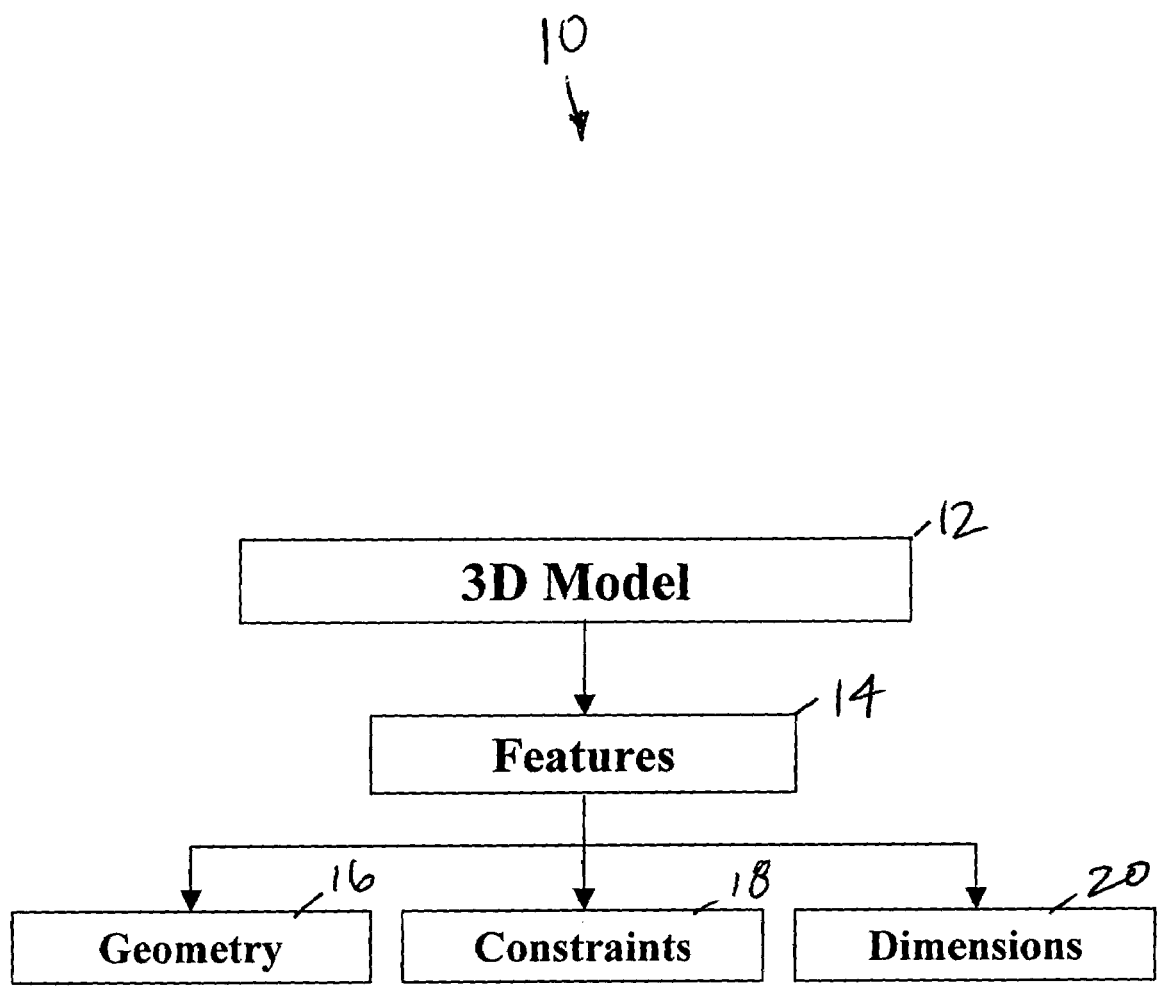
FIG. 1a depicts a block diagram of a three dimensional model in accordance with an exemplary embodiment of the present invention.

Referring now to FIG. 1*a*, a block diagram of a three dimensional model 10 of the present invention is depicted. The model 10 consists of a collection of features 14 and may include a plurality of feature relationships. Each feature class contains the necessary information needed to build the feature including feature geometry 16, constraints 18, and dimensions 20 which are preferably saved at the feature level 14 and not at the model level 12. The feature data is predominantly defined as a geometric representation of an individual feature type. This representation is preferably stored in a binary file format referred to as a Universal Feature Object (UFO). The order of features in the 3D model represents the order with which the model needs to be built in the targeted CAD system. It is the responsibility of the software associated with the individual CAD system interface to build the model in a manner consistent with that CAD system's expectations. The system interface software (named, for example, Feature Changer) is described in a subsequent section.

The UFO consists of two libraries that are necessary to create the 3D model. These two libraries are the geometry library and the feature library. The geometry library contains classes for all 2D and 3D entities as well as points and vectors. Common classes exist for 2D entities (for example, GE2D_Entity) as well as 3D entities (for example, GE3D_Entity). All entity types (lines, circles, etc.) will inherit from the common entity class. The data within each class is private and can only be accessed via member functions. In the geometry classes (both 2D and 3D), the member functions that set and retrieve the data actually copy the data between the class's private data space and the address of the data specified from the calling function. For example, a 2D line contains a start point. However, to retrieve this point, the calling function must pass an address where this particular point data is to be copied. This guarantees data integrity. Within each class, the data is classified as fundamental data, which is the minimum data necessary to define the entity, and the derived data, which is any information that may be used in or with the present invention. It is the responsibility of the individual classes to guarantee that any change made to the fundamental data via a function (for example, a member SET_function) will update the derived data accordingly. For example, if the start point of a line is changed via another function (for example, a Set_Start_Pt function), it is the responsibility of that function to update all fundamental data (i.e. length and slope of the line) accordingly.

An important class in the geometry library 16 is a 3D coordinate system class (for example, a GE3D_Coordinate_System class). The coordinate system is what permits each feature to be independently defined. It contains all the data necessary to detect a work plane, sketch plane, or face upon which a feature may need to be built. This data comprises plane vectors (positive x, positive y, and positive z), the origin of the plane, and the elevation (or distance) of the plane from world origin. In most cases, the geometry classes are simply a method of holding the data associated with some geometric type. An exception to this case is a class developed to aid in converting coordinate system data to other useful formats for use in the various applications (for example, a GE3D_Coordinate_System_Converter class).

Figure 1B:
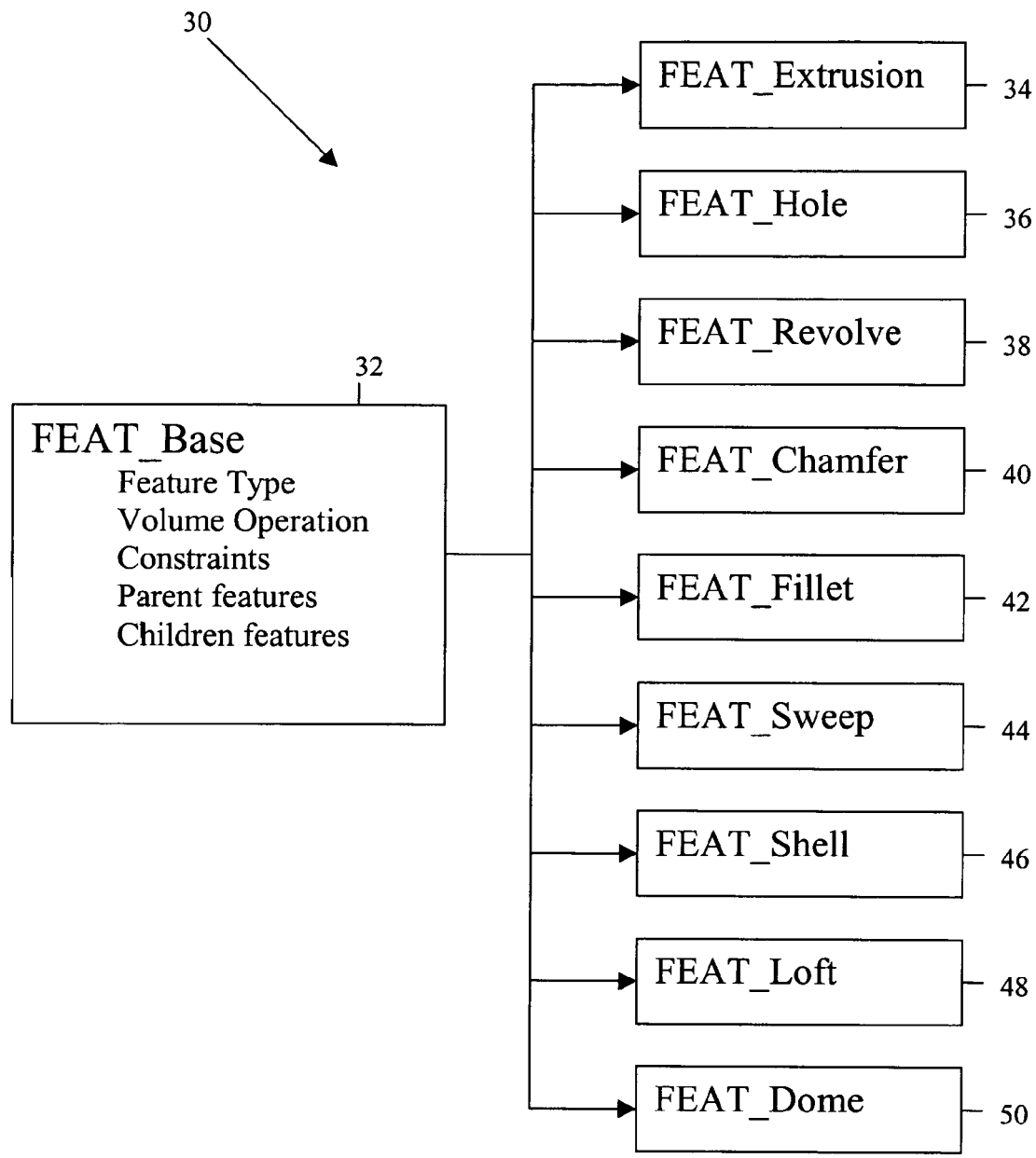
FIG. 1b depicts a block diagram of common feature representations in accordance with an exemplary embodiment of the present invention.

Referring now to FIG. 1*b*, a block diagram of common feature representations 30 is presented. All features typically inherit common properties from a generic, common, or base feature class (for example, FEAT_Base) 32. This base feature class 32 stores data that is common across most feature types. Some common properties include feature type, the volume operation of the feature, and the feature constraints. The feature types include, for example, common features such as extrusion 34, hole 36, revolve 38, chamfer 40, fillet 42, sweep 44, shell 46, loft 48, as well as CAD specific features such as dome 50. The volume operation consists of a join operation, a cut operation, and a volumetric intersection operation. The constraints are represented as an array of constraints and the constraint class is defined separately. Every individual feature 14 will typically inherit from this base class 32. This allows for easy expandability as additional features are incorporated from future CAD systems. Each individual feature class contains feature-specific data. For example, the hole feature contains all the necessary data to create a hole (including specialized holes such as counter bore).

Several features are created by first drawing a profile shape from a collection of entities on a specific surface. Two such features are extrusion features and revolve features. A separate class is created to handle all profiles (for example, a FEAT_Profile class). The coordinate system needed to draw a feature is defined within the profile class and is due to the nature of the coordinate system class that contains the data necessary to detect the face or work plane. Within the profile class, the data needed to draw the profile can be handled as an array of 2D poly-lines or entities. Each CAD interface application can build the profile using the method that is native to that CAD system when drawing the profile.

Feature constraints are handled via two classes. The first class, (for example, a FEAT_Constraint class), defines the constraint type, constraint data value (i.e. dimension value) and up to two (or more) constraint objects (such as a 3D point or a 3D edge). The second class, (for example, a FEAT_Constraint_Object class), contains the constraint object type indicating the constraint is to an edge or to a point, and the point or edge definition.

In addition to containing a data representation for a 3D feature-based model, the UFO of the present invention also contains a method for storing the 2D views via a class (for example, a FEAT_2D_View class). The view class contains an array of 2D entities (lines, circles, arcs, etc.) and a coordinate system associated with the view. The view data is not necessary to build a 3D model and may be null.

By utilizing the current format for the UFO, the software of the present invention is easily maintained and updated. The UFO can be incrementally updated with additional features and little or no overhead. By using an object-oriented approach with the UFO, compatibility between versions is simplified. Upward compatibility between versions of the UFO can be achieved through the use of inheritance. Another compatibility issue deals with versions of a particular CAD system and involves attempting to transfer a model from a CAD system to an earlier version of that CAD system. With the exception of new features that are not handled in an earlier version, backward compatibility is achieved (using UFO) through the CAD application.

Another advantage of the UFO of the present invention is the amount of data transferred. The UFO file is a binary file of the individual CAD features and the metadata associated with each feature. By utilizing the application to determine the build method of the model, CAD specific data is not transferred through an intermediate file. Therefore, the UFO can be used in a collaborative environment. The UFO also lends itself to other possible uses such as an incremental update of a model in a collaborative environment. Finally, the UFO can handle manufacturing features as well as design features which include pocket, step, notch, etc.

A Methodology for Incrementally Updating 3D Feature-Based CAD Models in a Collaborative Environment 3D CAD models can get extremely large in size for complex parts and assemblies such as those used on airplanes and automobiles, for example. If such complex parts are to be collaboratively designed using conventional CAD systems, users have the choice of simply marking up a visualization version of the model (that is smaller in size) or transferring the model among them each time a design change is made. This is true of collaboration either in a homogeneous CAD environment where all users have the same CAD system or in a multi-CAD heterogeneous environment where all or some users do not have the same CAD system.

A feature of the present invention allows collaborators to only share design changes and not transfer entire product models between collaborators. This feature is a significant improvement over current collaboration models and enables users to collaborate on complex models over narrowband networks.

Figure 2A:
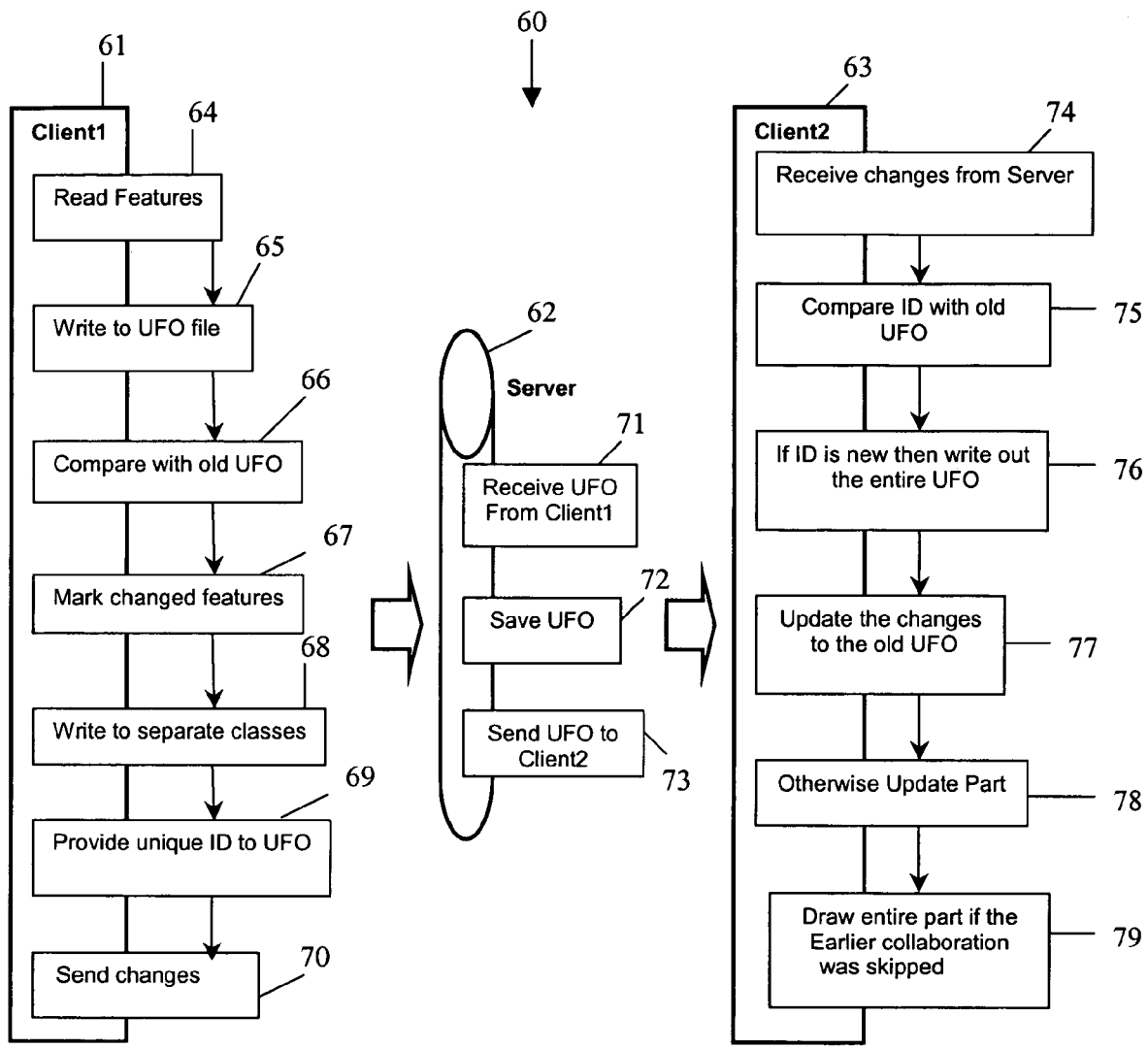
FIG. 2*a* depicts a system and flowchart for an incremental update procedure in accordance with an exemplary embodiment of the present invention.

Referring now to FIG. 2a, a system and flowchart for an incremental update procedure 60 is depicted. The system and flowchart 60 comprises a first client (client1) 61, a server that handles processing tasks 62, and a second client (client2) 63. The first client 61 reads the features in the model that is currently open at step 64 and writes the model to a UFO format at step 65. A comparison is performed with the older UFO (if one exists) at step 66 and any features that are changed are marked as shown at step 67. The changed features are written to a separate class at step 68 and a unique ID is attached to the UFO at step 69 before sending the changes at step 70 to the server 62. The server 62 receives the UFO from the first client 61 at step 71, saves the UFO at step 72 and sends the UFO to the second client 63 at step 73.

The second client 63 receives the changes from the server 62 at step 74 and compares the ID with the old UFO at step 75. If the ID is new, the entire UFO is written to the old UFO at step 76. Changes are updated in the old UFO at step 77, otherwise the part is updated at step 78. If the earlier collaboration was skipped, the entire part is redrawn at step 79.

Figure 2B:
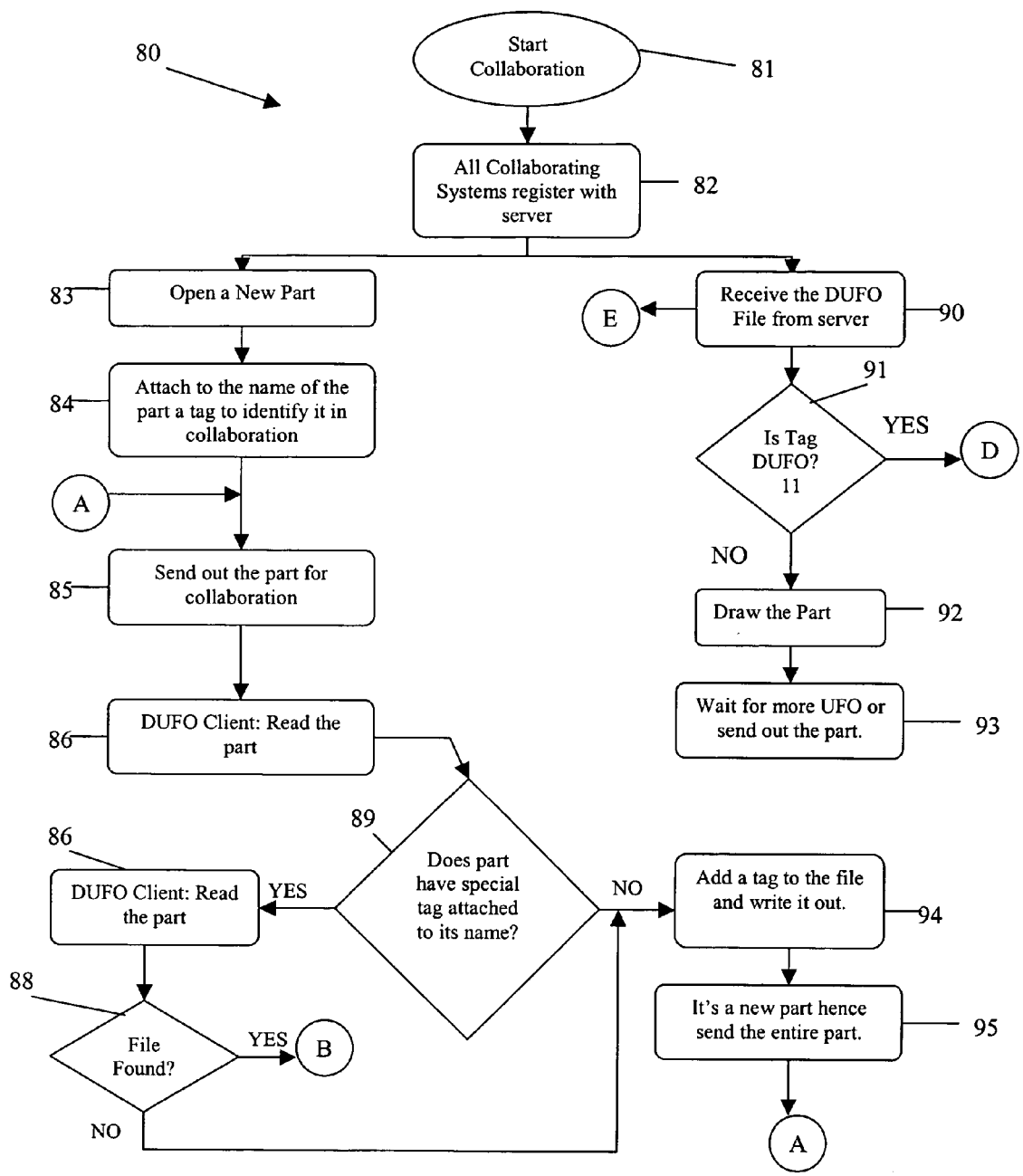
FIG. 2*b* depicts a flowchart for an incremental update phase using a Differential Unified Feature Object in accordance with an exemplary embodiment of the present invention.
Figure 2B:
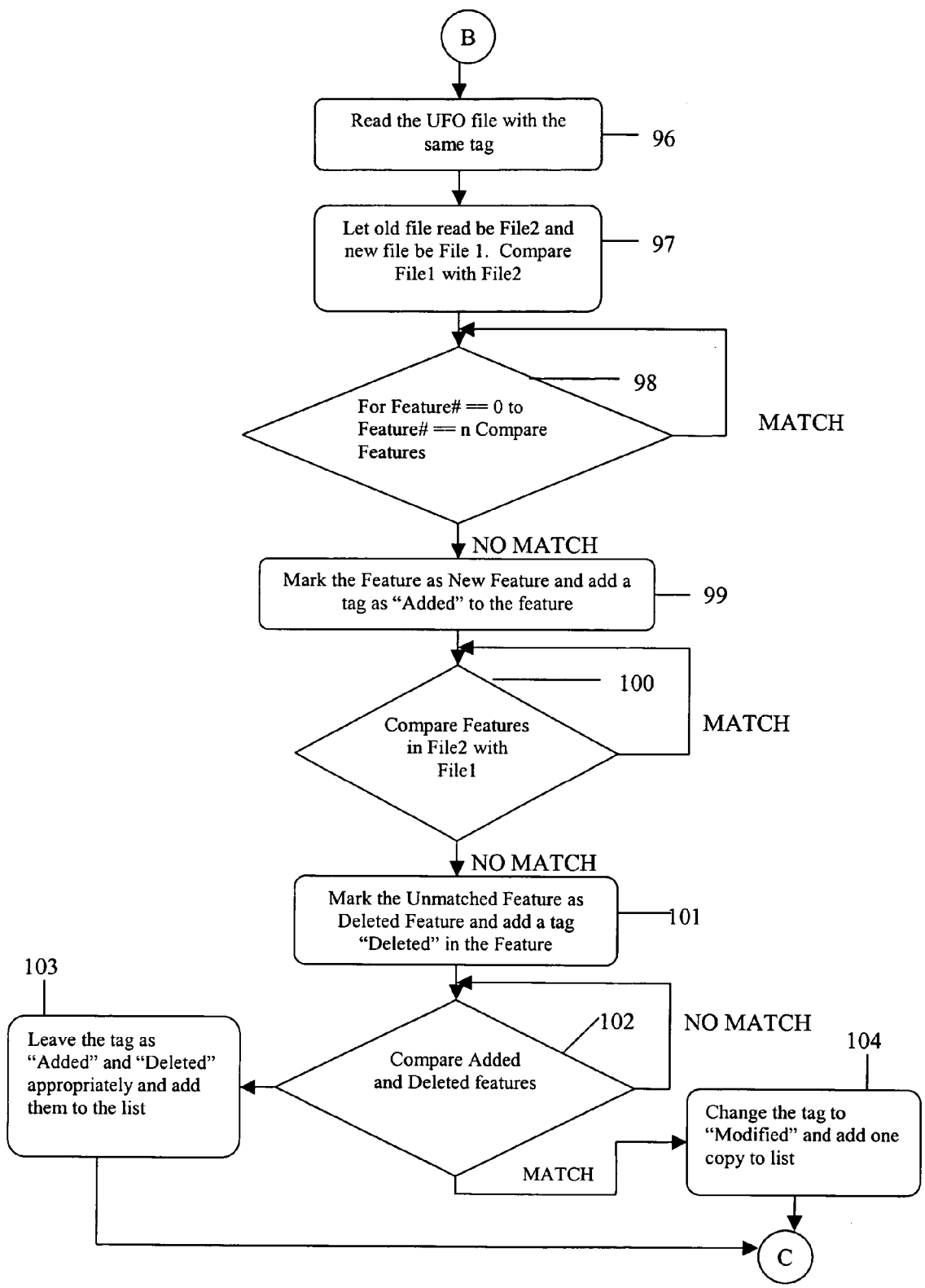

Referring now to FIG. 2b, a flowchart 80 for incremental update using a Differential Universal Feature Object (DUFO) is presented. The collaboration is started at step 81. All collaborating systems register with the server at step 82. A system that needs to send a new part to other collaborators will open a new part at step 83, attach a tag to the name of the part to identify it in collaboration at step 84, and prepare to send the part for collaboration at step 85. The client reads the part from the CAD system at step 86 which is checked to see if the part has a special tag attached to its name at step 89. If there is a tag attached to its name, then the client searches for another file in the system that has the same tag in its name. If the UFO file is not found (at step 88) or there is no tag available for the part name, then a tag is added to the file and written out at step 94. This new part is sent out for collaboration at step 95 and the system returns to step 85 and waits for collaborating on another part, or goes to step 90 to receive a new part from other systems.

If the file with the same tag is found at step 88 then this new file is read at step 96. The new file is compared feature by feature with the old file at step 97. Each of the features are individually compared at step 98. If a match is found, the method moves on to the other features; if not, the new feature is marked as "Added" and is added to a new list at step 99. This is done until the comparison is completed. When the comparison is completed, File2 is compared with File1 at step 100. The unmatched feature is marked as "Deleted" and added to the new list at step 101 and the same process is continued. Once the comparison is complete, the features in the new list are compared at step 102. If the features are the same, then the tag is changed to "Modified" and one copy is deleted from the list at step 104.

Once the comparison is completed, a "DUFO" tag is added to the new list and is serialized at step 105. This file is then sent to the server for collaboration at step 106. The server then sends the file to all the other collaborators at step 107. The other collaborating systems receive the file from the server at step 90 and check to see if there is a DUFO tag at step 91. If there is a DUFO tag, the file is run through a design conversion engine to map the features at step 108. The feature type and the index are received from the file, the corresponding feature is searched in the CAD system at step 109, and the changes to the part in the CAD system are affected at step 110. The same process is carried out on the saved UFO file and it is updated at step 111. The CAD system waits for a new part or sends another part at steps 112 and 93. When the collaborating system receives the part and if the part does not contain a DUFO tag, then the part is drawn on the CAD system at step 92.

The following description further describes and clarifies the system and methods described in FIGS. 2a and 2b. At the start of the collaboration session, a first user either opens an existing model inside the CAD system or creates a new one. The DUFO file format has a tag associated with each file that indicates if the file has been used in collaboration. The first user should save the model as a UFO file. This initial UFO file does not have a tag attached to its name. When a model is saved as a UFO, it is checked to see if it has a unique tag attached to its name. If not, a unique tag is attached and the part is written out into a file, which has a unique tag as a part of its name. If the tag is still not present, the collaboration client knows that this part is new and simply writes it out into a file with that tag as part of the file name. The first client then sends the part to the server which distributes the file to all the collaborators.

At the receiving end, the collaboration client receives the file and checks to see if the file has a "DUFO" tag attached to it. This is done after serializing the UFO file. In the case where the entire part was sent out, no tag would be found and hence the entire part would have to rebuild/build on the receiving end CAD system. A unique tag that came with the UFO is added to the name of the file on the receiving CAD system. Now that the part has been sent to all collaborators, the users can collaboratively make design changes. The first collaborator can change the model and write it out to the UFO. Now the model has a unique tag attached to its name. This tag is taken and compared with all the UFO files that are in the current directory. A match may be found (for example, this UFO file can be referred to as file2), and file2 is serialized and compared with the feature tree that was read from the model. File1 is compared with file2. Every feature from file1 (the feature tree read from the model presently open) is sequentially compared with every feature in file2. If the feature is not found in file2, the feature is added to a new list as an "Added" feature. Once the comparison is complete, features from file2 are compared with features from file1 (for example, the feature tree that was read from the opened model). Any unmatched feature is added to the new list as a "Deleted" feature. When comparing, if the features are same but their feature index is different, then the feature is added to the tree as a "moved" feature.

Once this comparison is complete, features in the new list are compared with other features. If the feature type and the feature index (this is the index that keeps track of the relative position of the feature in the feature tree) are the same, one copy is deleted and the tag on the other one is changed to "Modified". Once a complete comparison is performed, the new list is serialized (after adding a "DUFO" tag to the list). This new UFO is sent to the server which sends the file to all the collaborators other than the one that sent the file. The other collaborators receive the file and open it to see the DUFO tag. Each feature is extracted and is run through a feature-mapping engine to map the feature to an available feature in the CAD system. Once mapped, the mapped feature is taken and identified on the feature tree. The identification is accomplished using the feature type and the relative feature index in the tree. Once identified, the feature is either deleted, added or modified based on the tag that the feature carries. Added features are simply added without comparing these added features with existing features. Only modified and deleted features have to be compared.

In the case of fillets and chamfers, modified features are first deleted and then added. This is done because fillets and chamfers are typically dependant features and have a modified tag since the feature on which they are dependent is modified. This would make sure that the fillet and chamfer move to the right place when modified. When a fillet is deleted or added, it is reordered in the feature tree since all added features are by default added at the end of the feature tree. Since this does not maintain the design intent, when the feature is deleted, its position is noted down. Thus, when the modified feature is added, it is moved to the old position in the tree thereby maintaining the design intent.

Currently, when a feature is being modified, all attributes of the feature are modified even though a particular attribute would have remained the same. Eventually, the DUFO can note only the changes or mark and change the changed parameters. Once the feature in the DUFO file has been mapped and compared with the feature tree, the new features are added to the file that has the same tag as the part that is open in the CAD system. This makes sure that the UFO file in the system is up to date with the one opened in the CAD system. The feature is added or deleted from the list and its relative position is maintained in the list.

When collaborators are collaborating with a heterogeneous CAD system, a problem of un-mappable features usually arises. These features are either converted into another feature supported by the CAD system or added to the part as geometry (surfaces stitched together). In such a collaboration situation, incremental updating is difficult. For example, Collaborator A may have a dome feature and sends the file to Collaborator B who builds up the part by changing the dome to a loft in his/her system (since the dome is unsupported by Collaborator B). Collaborator B may then add a few more fillets and send the file to Collaborator A. When the incremental update is not used, the entire file is sent to Collaborator A who loses the dome as it gets converted into a loft on his/her system. This scenario is called a loop-through problem.

The present invention overcomes the loop through problem. When Collaborator B adds new fillets to the part and collaborates, the new part is compared with the one saved in the system. New fillets are detected, but the loft is not detected as changed. So only the fillets go to Collaborator A as new features and Collaborator A does not lose the dome.

In the present invention, every feature attribute is compared between the files. For example, if two extrusion features are being compared, attributes such as extrusion height, blind or through extents, and extrusion directions are compared. The profile is also checked. Each entity in the profile is compared and the coordinate system attached to the profile is also checked. If a change is found in any one of the attributes, the feature is added to the list that maintains every new, deleted and changed feature. If the base feature is changed, most (if not all) of the other features will also need to be changed. In such a situation, it is appropriate to send the entire file to the other end rather than sending a DUFO file.

The manner in which the UFO is organized is similar to the manner in which features are represented in a feature tree. This helps in the comparison, deletion and addition of features. The UFO is object oriented and extensible which aids in the easy addition of comparison operators, and comparison of disparate features with just one class. Serialization of a single feature or list of features is possible. Serialization of single feature without involving the depended features helps in making the differential update possible.

A Methodology for Automated and Semi-Automated Conversion of 2D CAD Drawings to Parametric Feature-Based 3D CAD Models via the UFO The present invention also provides a robust and modular approach to converting drawings from 2D to 3D and consists of three primary steps in the conversion of a 2D drawing to a 3D feature based model. These steps are feature detection, feature analysis, and model creation which are further described below.

Figure 3A:
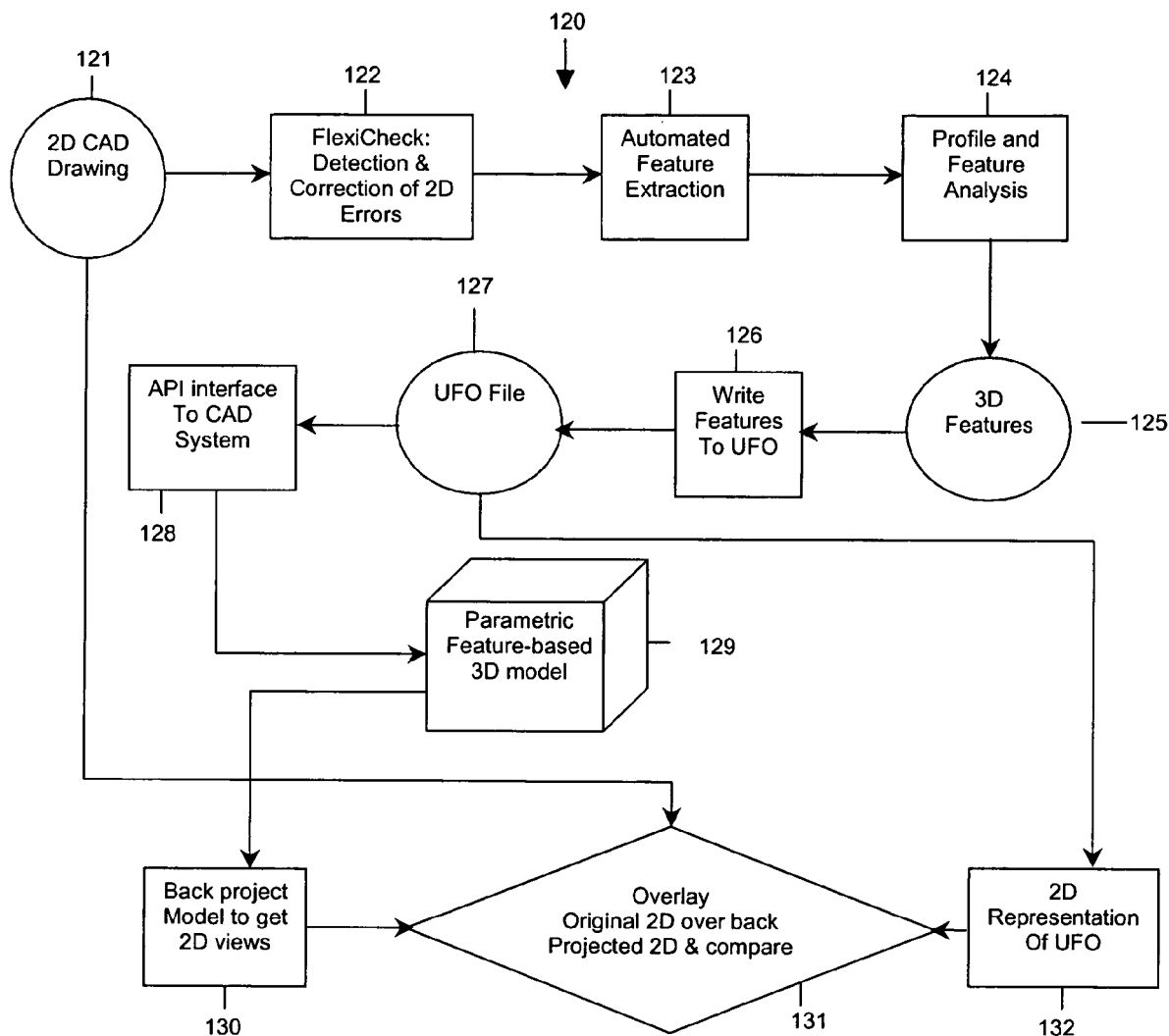
FIG. 3*a* depicts a flowchart for 2D to 3D conversion in accordance with an exemplary embodiment of the present invention.

Referring now to FIG. 3a, a flowchart 120 depicting a 2D to 3D conversion is presented. The 2D drawing 121 is processed to detect and correct any errors at step 122. The clean drawing is then sent to an automated feature detection system at step 123, followed by profile and feature analysis at step 124. The result is a list of 3D features 125 that are written to the UFO at step 126. The resultant UFO file 127 is interfaced with a commercial CAD system using an API interface, for example, as shown at step 128. The final result is a parametric feature-based 3D model at step 129. As part of a post-processing step, the final model is back projected to obtain the 2D drawing views at step 130. These views are overlaid on top of the original 2D drawing views and compared at step 131.

In a further embodiment, the method may proceed to various steps where this result is merged with a 2D representation of the UFO file to form the basis for any interactive feature definition for features that were missed by the automated conversion. In the interactive feature definition, a user could define feature profiles and interactively specify feature heights to completely define a new feature in the 2D drawing. This feature could then be added to the existing UFO file to create a new UFO file that can again be interfaced to the CAD system to generate a new 3D model.

Figure 3B:
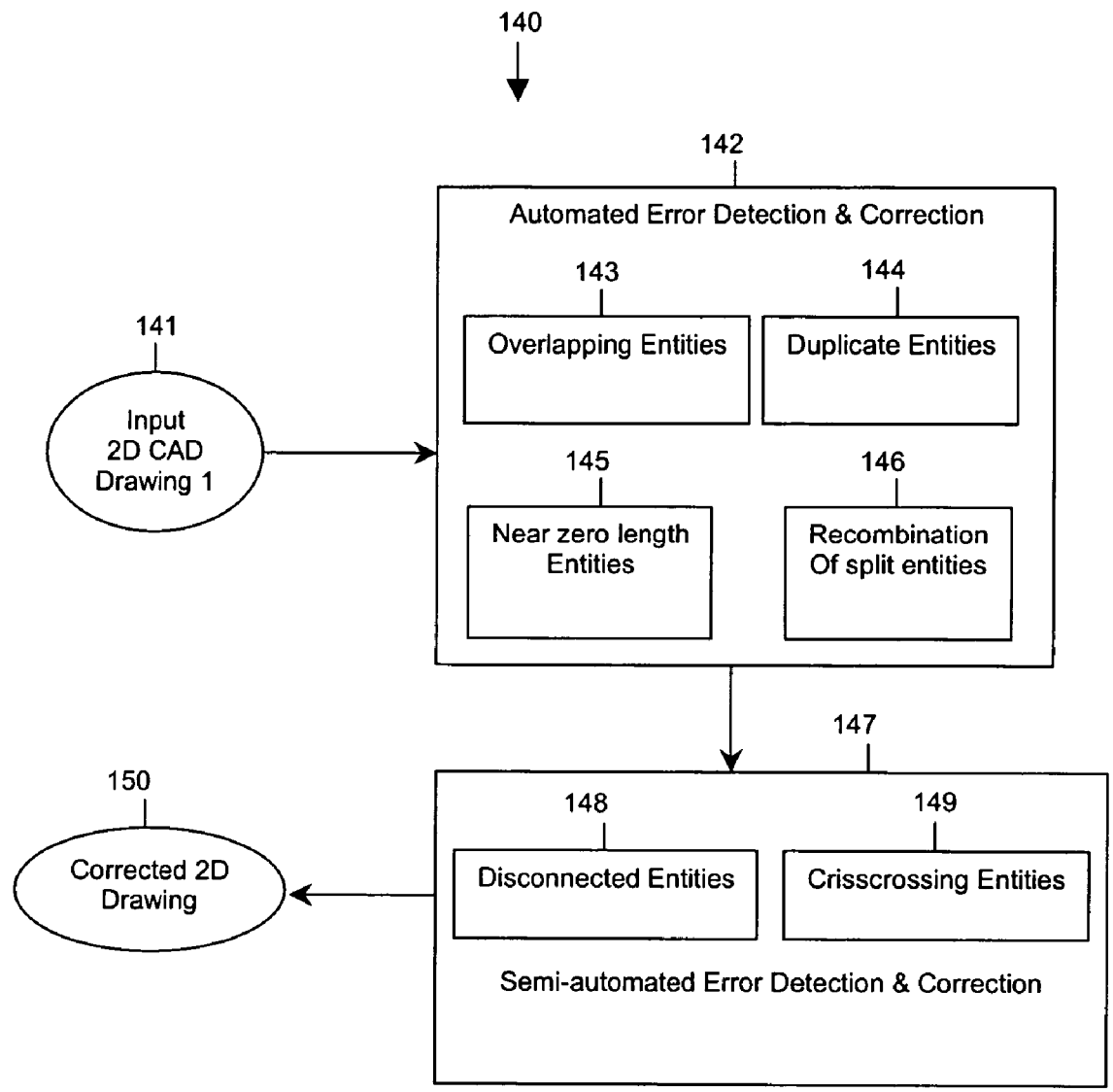
FIG. 3*b* depicts a system and flowchart for automated preprocessing steps for 2D to 3D conversion in accordance with an exemplary embodiment of the present invention.

Referring now to FIG. 3b a system and flowchart for depicting a drawing error detection and correction 140 is presented. A 2D CAD drawing 141 is processed through an automated error detection and correction system 142. This system 142 consists of a means to automatically detect and correct overlapping entities at step 143, duplicate entities at step 144, near zero length entities at step 145 and other means to recombine split entities at step 146. The resultant 2D drawing is then processed by the semi-automated error detection and correction system 147 which consists of a means to detect disconnected entities at step 148 and crisscrossing entities at step 149. The final result is a corrected 2D CAD drawing 150.

Figure 3C:
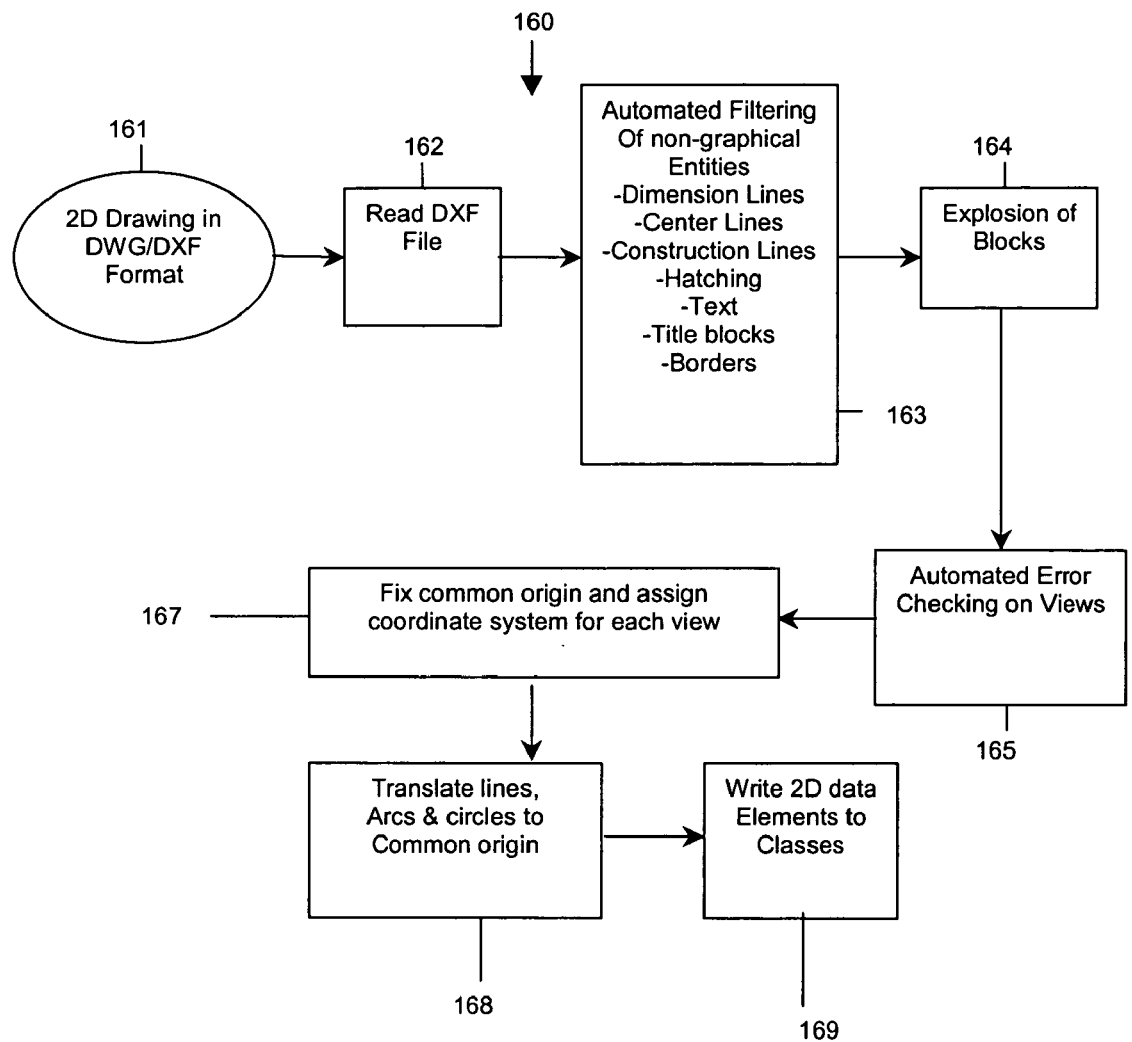
FIG. 3*c* depicts a flowchart of drawing error detection and correction in accordance with an exemplary embodiment of the present invention.

Referring now to FIG. 3c, a flowchart 160 depicting automated preprocessing steps for 2D to 3D conversions is presented. A 2D CAD drawing 161 can be formatted in various formats and is preferably a DXF or DWG format. The file 161 is read at step 162 and automated filtering of all non-graphical entities is performed at step 163. These entities include dimension lines, centerlines, construction lines, hatching, text, title blocks and borders. Any blocks in the drawing are exploded at step 164 and error checking is performed on the preprocessed drawing at step 165. The clean drawing is then further processed by automatically splitting the entities corresponding to the top, front and side views and a common origin is fixed for each view at step 167. All of the entities (for example, lines, arcs and circles) are then translated to the common origin at step 168 and the data is written to classes at step 169.

Figure 3D:
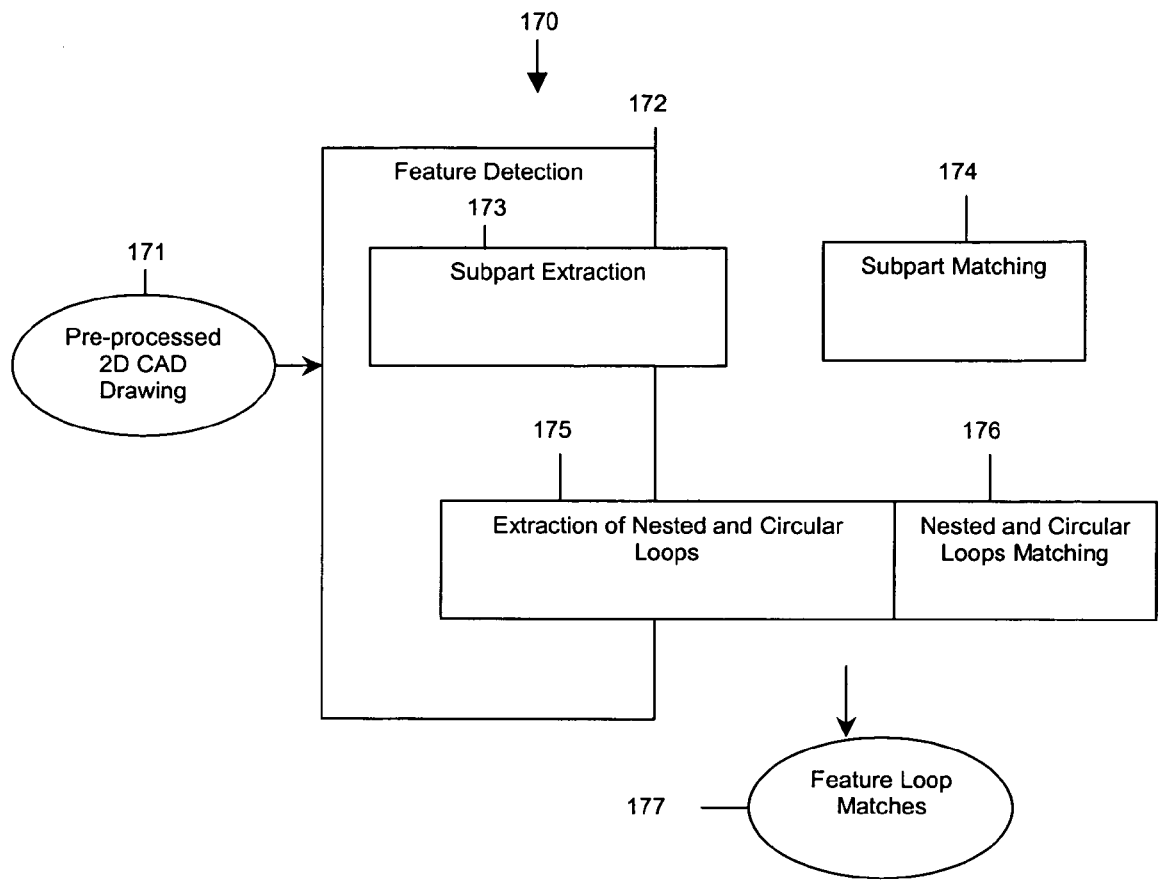
FIG. 3*d* depicts a system and flowchart for a detection phase in accordance with an exemplary embodiment of the present invention.

Referring now to FIG. 3d, a system and flowchart depicting a feature detection phase 170 is presented. The first step, feature detection 172, is the most crucial since missing features and/or wrong features can cause problems in later conversion steps. Feature detection is primarily performed as a two-step process—extraction of feature loops 173 from the 2D views and matching these loops in all views 174. These feature loops can either be subparts (which represent joins in 3D) or nested loops (which represent cuts or holes and sometimes joins in 3D). More specifically, the feature detection means are classified into four stages—subpart extraction 173, subpart matching 174, nested and circular loops extraction 175, nested and circular loops matching 176, and corresponding feature loop matching 177.

Figure 3E:
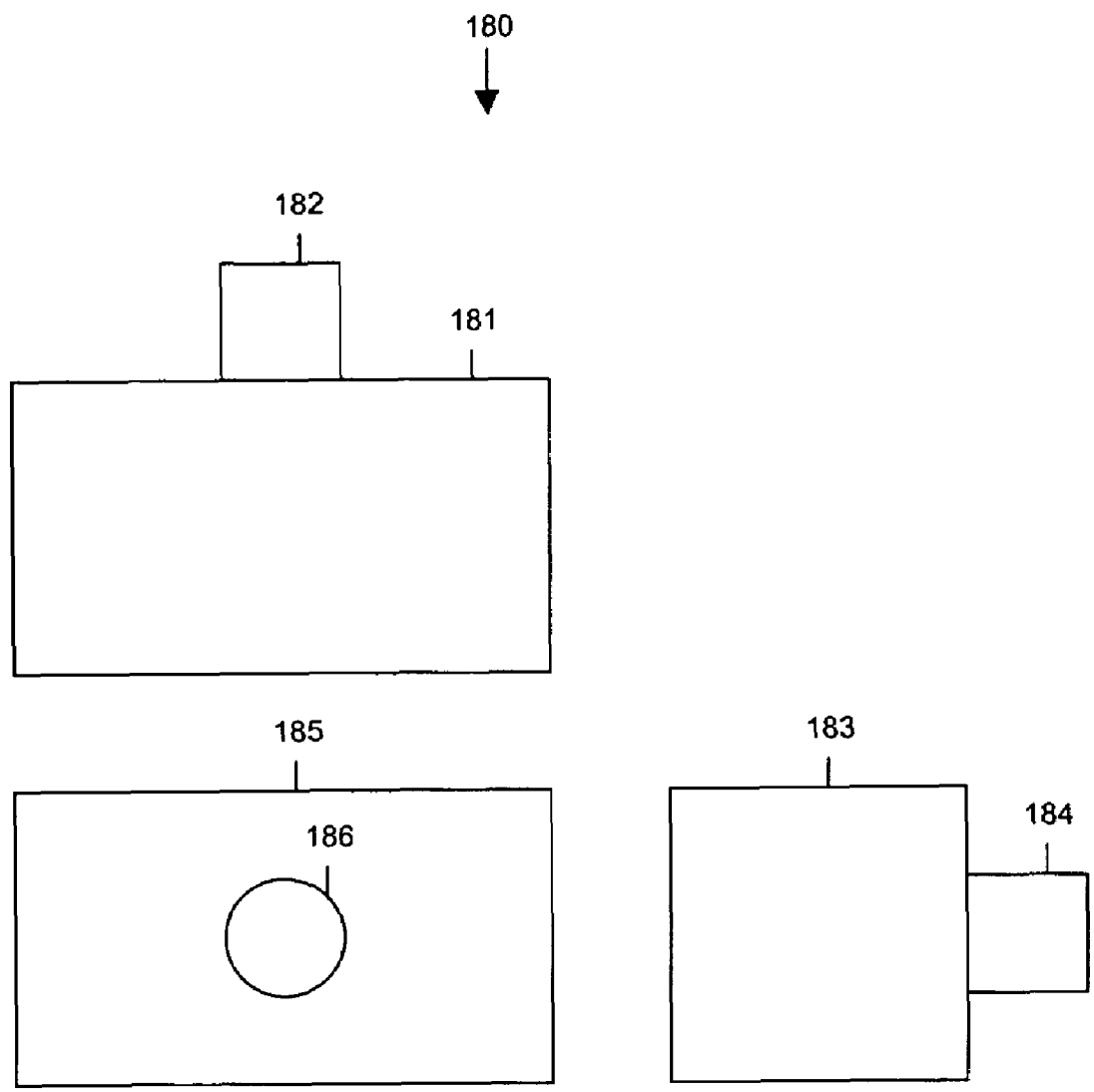
FIG. 3*e* depicts block diagrams illustrating subpart extraction in accordance with an exemplary embodiment of the present invention.

Referring now to FIG. 3e, block diagrams illustrating a subpart extraction 180 is presented. Many models consist of subparts that are join features which may be a single feature or a combination of features. For example, a block 185 with a cylindrical boss or hole 186 attached would consist of two subparts. However, the block 185 could easily have additional holes within it. Those holes would be included within the block subpart. Extraction of these subparts is an important step. After initial preprocessing of an input, each 2D view consists of a nodal network with an outer boundary loop. The subpart extraction is executed for each view. This consists of a counterclockwise traversal of the outer loop's entities searching for non-trivial nodes whose directional change (the angle between two boundary entities) is less than 180° to determine a probable subpart. After identifying the beginning point of a subpart, a traversal algorithm is executed which returns to this starting node creating the subpart loop. A subpart view is created which contains the entities of the subpart loop and any inclusive entities. This subpart extraction algorithm is repeated on every subpart until there are no more subparts being extracted for a view.

Once all subparts views have been extracted, an attempt is made to find matches for each. This is a two-step process. Initially, subparts are compared with subparts from other orthographic views looking for a possible match. Further searches look for matches using, for example, an atomic loops means. This second step is executed when there is a third view or only two views where the matching loop is nested inside the view. An example of this is the block with the cylindrical boss with three views 181, 183, and 185. The cylindrical boss subpart 186 will have a subpart view (or views) associated with the rectangular extrusion loop 182, 184, while the remaining view will have a circle within a square. If there are three views, the two rectangular subparts will be matched during subpart matching, while the associated circle will be detected via the atomic loops means.

Once subpart extraction and matching is complete, the remaining, nested features will be detected. First, any circle loop that has not been marked as subpart match is handled. For each circle, a search is made in the orthographic views for tangential reconstruction matches, followed by tapered reconstruction matches. This will include holes, bosses, tapered holes, tapered bosses, drill tip angles, and circular fillets/chamfers.

A final step for feature detection involves a means for the nested loops. Nested loops are basically internal loops that are completely inside the outer boundary of the input views (i.e. attempts to find matches use the atomic loops). At each of the previous steps, entities are marked as 'used' once they have been associated with a feature (subpart or circular feature). The unused entities become the focal point of the nested loops means which eliminates unnecessary processing time and reduces the number of invalid detected features.

Nested loops are formed in a view when loops corresponding to two or more features overlap each other. The main purpose of this means is to identify the individual features in the nested loops by matching loops in available 2D views. A 3-stage approach is followed to identify the features. The steps involved are identification of atomic loops, combination of atomic loops, and validation of combined loops. A beginning step is to identify all possible loops in each view. These loops are called atomic loops which are passed as the input for the next step. A next step is to identify the combination of loops in each view, which would correspond to a valid profile. The view in which the number of atomic loops is a minimum is taken as a reference. Each atomic loop is checked with the other view for any match. If a match was found, then the dimension of the loops is verified. If no match was found then it is considered an invalid loop. For example, if top and front view loops were to be matched then x-coordinates would be matched. If the dimension were not found to be equal, the combination of loops would be employed.

A later stage is the validation of the combined loops. In this step, the projection of the combined loop from one view is mapped on to the other view and checked for a match. The projection could be along the horizontal or vertical axis depending on the views under test. If any projection did not give a match, the loop corresponding to that projection would be removed from the combination. After the profile is validated, it is taken from one view while the height would be taken from the other view.

Upon completion of this phase, an array of matched loops which represent one or more features in different orthographic views are encountered resulting in a single matched loop that can be viewed as a back-projected representation of a 3D feature. It is not necessary to have all views represented for each feature. This allows for future expansion to additional views, in particular projected views.

Converting medium-to-complex 2D drawings with complete accuracy is difficult to achieve primarily because there may be multiple interpretations in matching feature loops in all orthographic views. Introducing human interaction at various stages of the conversion process would lead to better identification and interpretation of loop matches and would improve the percentage of drawings that can be successfully converted. As such, the present invention allows for a semi-automated approach, which provides a layer of user-interaction over the automatic software, and aids the automatic software in improving accuracy.

More specifically, the present invention introduces an application to perform 2D to 3D conversions that will allow the user control in the creation of the 3D model. This interactive process is a combination of the automated software and user controls. An initial stage consists of a feature detection step of the 2D to 3D conversion process. If the features selected are incorrect, or if one or more features are missed during the extraction process, the 3D model cannot be correctly created. A separate path is thus represented within software but is not developed as a separate application. This path can be linked in conditionally. In this manner, only one application will need to be maintained. Various tools enable the user to make selections via the desired CAD system.

The matched loops automatically detected by the software are presented one at a time to the user in the target CAD system. The user is then given the option to either accept the matched loops as such, reject them (if they are totally wrong, for example), or modify them (if minor flaws are uncovered, for example). When all of the loops are processed (either accepted, rejected or modified), the user also has the option of adding more loops, which, for example, may have been undetected by the automatic software. The conversion then proceeds to feature analysis and model build using these new matched loops.

Figure 3F:
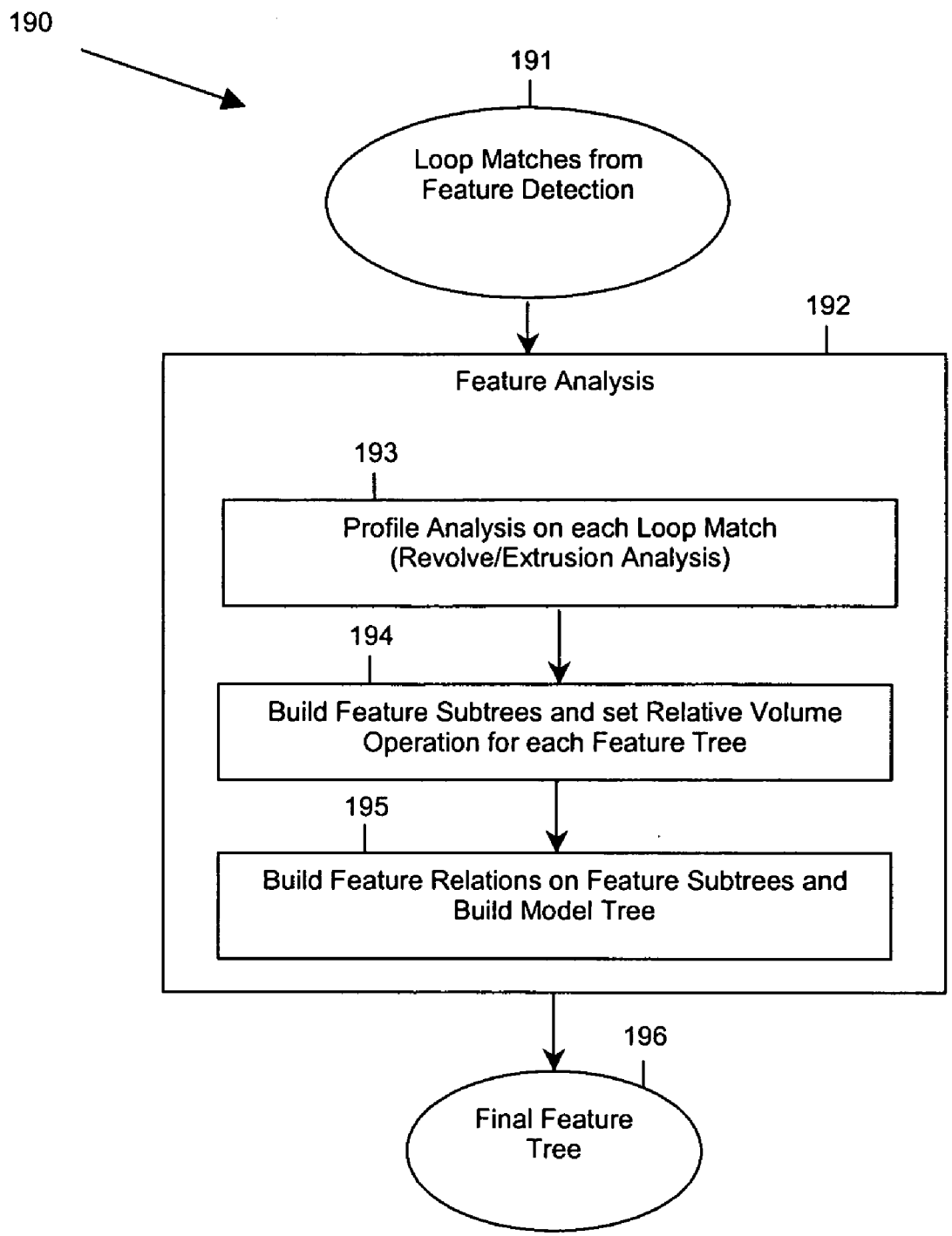
FIG. 3*f* depicts a flowchart for a feature analysis phase in accordance with an exemplary embodiment of the present invention.

Referring now to FIG. 3f, a system and flowchart for the feature analysis phase 190 is presented. The array of matched loops 191 is the input to a feature analysis engine 192. Feature analysis primarily consists of two parts. The first part, profile analysis 193, is responsible for analyzing the actual loops of a matched loop array to look for specific feature types. Each feature, once it has completed the profile analysis stage, is turned into a feature tree such that the output of the profile analysis stage is an array of feature trees 194. The second part, feature relationship 195, is responsible for analyzing how each feature is related to every other feature for building the model. A description of the features is given followed by a description of each feature analysis step.

The feature tree is a classic tree data structure containing a root node and children nodes where each child node, in turn, can contain more children nodes. Each node contains the necessary data to create a single 3D feature. That data consists of the matched loops, the revolve profile if necessary, a reference to the parent feature tree, the profile loop index, the associated tree level, a blind/through flag, and a pointer to the 3D feature (for example, FEAT_Base 32). Additionally, the tree contains two volume operation values—one indicating the relationship to the parent feature (same or opposite) and one indicating the actual operation (cut or join).

Each feature (matched loop) goes through up to three different stages in the profile analysis step. If a feature is found to be a specific type during any of the three stages, subsequent test are ignored.

The first stage is a revolve test. This means will determine if the feature is any kind of revolve feature and includes holes, bosses, tapered holes/bosses, drill tip angles, and circular fillets/chamfers as well as traditional revolve cuts and joins. Initially, the means searches for a circle loop as one of the matched loops. If there are no circle loops, the software moves on to the next profile test. However, when a circle is found, the remaining loops are tested for valid revolves. If a valid revolve is not found, one half of the loop is randomly selected to be the revolve profile, but information is propagated to the user which indicates that the revolve feature has an error in the original 2D drawing. The revolve algorithm also detects circular fillets on holes and bosses. Once complete, a tree structure is created for the feature. Child trees are created on the returned tree for circular fillets.

The second stage is a circular boss test and involves a conditional algorithm means. Inputs from the initial dialog box determine whether this algorithm is executed. The algorithm determines if a feature, while not actually a circle, can be converted to a cylindrical boss with cuts. If one loop of the matched loops contains arcs that share a center point and radius, an algorithm is executed to test if the entire loop is within a circle of the same center point and radius. This test contains a simple Boolean XOR function to determine the possible cuts, followed by a test to see if all cuts are within the circle.

If the feature is eliminated from both tests above, a third means is executed which selects one loop (based on complexity) to be the extrusion profile, and converts any other non-rectangular loops to a series of cut features. Again, a simple Boolean XOR function is executed to determine possible cuts. This means further executes an additional test to determine possible chamfers and fillets on a profile. A feature tree is created with the matched loops and their associated relationships with each other.

After the profile analysis stage is complete, an array of feature trees exist that mostly contain single feature trees with a few multi-level trees containing fillet and/or chamfer child trees. The purpose of the feature relationship software is to determine the relationship between every pair of connecting features. This is accomplished by comparing the relationship between the two features' loops containing the same coordinate system (i.e. from the same view). Loop relationships include one loop inside the second loop, one loop inside or outside the second loop with a shared edge, one loop overlapping the second loop, or two equivalent loops. In the final case, the two features are tested to possibly eliminate one feature or to combine the two features. A combination of relationships is necessary for features to be related and one relation must be overlapping or contain a shared edge. Using the previous block 185 with the cylindrical boss 186 as an example, the circle for the boss is "inside" the block's rectangular loop in one view, whereas the orthographic views contain rectangular loops for both features. The relationship between these two loops is "outside-shared" so the two features are related with the same volume operation. Had the circle loop been associated with a hole within the block instead of a boss, the rectangular loops would have had an "inside-shared" relation and the volume operation would be opposite. Once a relationship is found between two features, one feature will be have the second feature listed as its ancestor, while the second feature will have the first feature listed as its descendent.

After the first two stages are completed, all features and their relationships to one another are available to begin building the 3D model. An initial step in the model creation process is to create a single tree (if possible) from the array of trees and their relationships. The root node, or root part, of the model is first determined. A feature with no ancestors is selected as the root node feature. Once the first feature is selected, the features are added to the tree via the descendent route until no more descendents can be added. If there are features remaining that have not been added to the model tree, an ancestor feature will be added, followed by a test for the inclusion of further descendent trees. This process, one ancestor followed by descendents, will continue until all possible features have been added. As each feature is added to the model tree, the first of the volume operators is set indicating whether the child (descendent) feature is the same or an opposite operation as its parent feature. In the event that a feature is missed, that feature will be added to the error file.

Once a single 3D model tree exists, it is necessary traverse the tree again setting the final volume operation flag to cut or join. A tree function (for example, a CascadeSet function) exists which traverses through the nodes in a top down manner, setting the volume operation to cut or join depending on the parent feature and the relationship operation.

Once the 3D model is complete with the volume operations, a tree function (for example, a PopulateFeatModel function) will create a 3D model of type FEAT__3D_Model, for example, by converting each node of the tree to a 3D feature and adding it to the 3D model. Two functions exist, one that will create join features and a second that will create cut features. In both cases, analysis of the profile loop will determine the feature type. If the profile loop is a circle and the operation is a cut, a feature of type FEAT_Hole, for example, will be created. Before a hole is created, a test is made that checks any possible hole to see if it is a tapped hole. If the hole's profile is made up of dashed entities, and the node contains a child node with a volume operation of opposite and a profile type of circle, a test is made to see if the boundaries of the outer circle's reconstruction loops are within the inner circle's bounds. If so, a tapped hole is created combining two nodes and the tree is updated accordingly.

After a 3D model is created, a final step is executed which will combine 3D features. Recombination of features includes, two concentric connecting holes converted to counter-bore or countersink holes or a hole and a tapered hole being recombined to a hole with a drill tip angle.

Further information relating to the various features and embodiments of the present invention is available in Appendices A-D. More specifically, Appendix A describes an object-oriented analysis of three primary libraries (Geometry, Features, Geometry Network) in order to produce more robust classes. The data (attributes) associated with each of the classes, the relationships between the classes, and the classes that execute certain actions are determined. Appendix B describes multiple CAD-based applications including 2½-D editing and 3D-to-3D CAD exchanges. Since similar algorithms exist across multiple applications, libraries of related classes, their attributes and the methods (operations) that are performed on these classes are described. Appendix C describes an application to perform 2D to 3D conversions that will allow a user control in the creation of the 3D model.

Although an exemplary embodiment of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims.

APPENDIX A

GS Object Oriented Analysis

Introduction. An object-oriented analysis of the three primary libraries will result in more robust classes. The purpose of this analysis is to best determine the data (attributes) associated with each of the classes and the relationships between the classes. It will determine which classes should execute which actions. This document will summarize the classes associated with the three major libraries (Geometry, Features, Geometry Network).

Structures of Libraries Each library will contain only the related classes. Every class within a particular library will begin with a code that indicates to which library the class belongs. In the initial three libraries, the code will be as follows: Geometry (GExD_) where x is replaced with 2 or 3 to indicate dimension, Features (FEAT_, and Geometry Network (NET2D_). Under no circumstances will the library include application type code. For example, the Network library will contain all the code necessary to build and maintain a 2-dimensional nodal network of the drawing. Code will exist to search the net for a specific item using filter classes. For example, a method to "Find all Vertical lines at x-coordinate in this view" can be accomplished by setting appropriate flags/values on an Entity Filter (i.e. lines_only_flag, vertical_flag and x_value) and executing a "Find" function in a cluster or view. This will result in all lines meeting the criteria being returned to the application, however, it is the responsibility of the application to perform the desired logical operations on the data. These operations, in no way, belong in the library.

Structures of Classes. All the library classes have two kinds of data—fundamental and derived. The fundamental data is the minimum data needed to create the entity. The fundamental data associated with a line is the start point and the end point. Derived data is calculated data that can be used multiple times during the execution of the application. For example, in 2D-to-3D conversions, a line will be checked repeatedly to see if it is a horizontal or vertical line. Therefore, when a new line is created, the vertical and horizontal flags will be set accordingly. This is considered derived data.

In all cases, the class data will be "protected". In other words, it will not be possible to access the data directly except via a "derived" or "friend" class (for more information, see Visual C++ documentation). Instead, each class will contain member functions to access the data. For example, the line class will have member functions "Is_Line_Horizontal ( )" and "Is_Line_Vertical ( )". In most cases, the functions will actually return a copy of the data. This will ensure the validity of the data.

Validity flags will exist for many of the classes—in particular the geometry and the features. These validity flags will be important when the data is being retrieved. If the data is not valid, an error code will be returned to the user indicating this.

Whenever possible, base classes will be created to avoid duplicating data and/or member functions. For example, in the geometry library, an "Entity" class will be created to represent the basic entities. The "Line" class and the "Circle" class will inherit directly from the "Entity" class and the "Arc" class will inherit from the "Circle" class.

Geometry Library. The geometry is divided into two-dimensional and three-dimensional entities. Entities are points, vectors, lines, arcs, and circles. Additional geometry classes are polyline and polyline point in 2D and coordinate systems in 3D. A brief description of each geometry class with its attributes will be given. All the base geometry classes inherit from the CObject class. Since the geometry is a fundamental part of the features, this is necessary for serialization of the 3D feature model to a file.

The geometry library is the basic foundation for all Imagecom products. The only 'function' of the library is to maintain the validity of the data. Data is set and retrieved via member functions. Data set functions, however, exist at a minimum. Most of the classes will be instantiated with the necessary data. The constructor will be created with the minimum data and each constructor will be responsible for generating the derived data and checking for validity.

GE2D_Point

This is a two-dimensional point with an x- and y-coordinate. This has no derived data GE2D_Vector This is a two-dimensional vector with an x and y component. This has no derived data.

GE2D_Entity

This is the base class for all the 2D entities. Validity flags will exist for all the data. The fundamental data includes: start point, end point, bounding box (lower left and upper right hand corners of the entity), and bulge factor. The derived data is horizontal and vertical flags, and the segment length. For a circle, the start point, end point and bulge factor will all have a validity flag set to false. The entity will also contain an entity type to avoid the necessity of excessive typecasting in the software.

GE2D_Line

This class inherits data from the GE2D_Entity class. In addition to having access to all the data in the base class, this class also has derived data—start tangent vector, end tangent vector, slope, and angle of the line. The start and end tangent vectors are vectors which show the direction the line is pointing "away from" the start or end point. The line also has a separate slope and angle since each has a separate use. Validity flags are associated with all of the derived data.

GE2D_Circle

This class inherits data from the GE2D_Entity class. In addition to having access to all the data in the base class, this class also has fundamental data—radius and center point with associated validity flags. Derived data includes quadrant points for the circle and a single quadrant point validity flag.

GE2D_Arc

This class inherits data from the GE2D_Circle class. In addition to having access to all the data in the base class, this class also has derived data—start, end, and included angle, start and end direction angles, start and end tangent vectors, and start and end direction vectors. In general tangent data associated with the specified point (start or end) is tangential to the arc at the actual point. The directional data associated with the specified point is tangential to the arc at a point ¼ distance of the arc segment from the start/end point.

GE2D_Polyline_Point

This class inherits data from the GE2D_Point. In addition to having access to the coordinate data in the base class, fundamental data for this class includes the bulge factor for the point along with the validity flags.

GE2D_Polyline

This class inherits data from the GE2D_Entity class. The fundamental data associated with this class is the number of vertices and the polyline points (vertices). Derived data includes flags indicating closed polyline and/or circular polyline.

GE3D_Point

This is a three-dimensional point with an x-, y- and z-coordinate. This has no derived data GE3D_Vector This is a three-dimensional vector with an x-, y-, and z-component. This has no derived data.

GE3D_Entity

This is the base class for all the 3D entities. Validity flags will exist for all the data. The fundamental data includes: start point, end point, and bulge factor. The derived data is start and end tangent vectors, and the segment length. For a circle, the start point, end point and bulge factor will all have a validity flag set to false. The entity will also contain an entity type to avoid the necessity of excessive typecasting throughout the software.

GE3D_Line

This class inherits data from the GE3D_Entity class. All the data necessary for this class is obtained through the base class.

GE3D_Circle

This class inherits data from the GE3D_Entity class. In addition to having access to all the data in the base class, this class also has fundamental data—radius, normal vector to the circle, and center point with associated validity flags.

GE3D_Arc

This class inherits data from the GE3D_Circle class. In addition to having access to all the data in the base class, this class also has derived data—start, end, and included angle.

GE3D_Coordinate_System

This class has fundamental data—origin (3D point in world coordinate system), and positive x-, positive y-, and positive z-axis vectors. Derived data includes elevation with respect to the world origin, a flag indicating if the z-axis point away from the origin, and a matrix and its inverse which converts from world coordinate system to 'this' system and vice versa. A single validity flag indicates a valid coordinate system.

GE3D_Coordinate_System_Converter

This class contains will handle all conversions from one coordinate system to another coordinate system.

Features Library. This library contains the classes needed to define a fully constrained three-dimensional model. It also contains a class to contain the original two-dimensional drawing split into orthographic views. The feature classes are summarized below starting with the two-dimensional views, then the classes needed to create the basic features, thirdly the 3D model and finally the classes needed to constrain the model. The current design calls for the basic features handled by the initial Imagecom product only (FlexiDesign), however, the class structure lends itself to easy expansion.

The features library is the basic foundation for all three dimensional models and features. The purpose of these classes is to maintain the validity of the data. Data is set and retrieved via member functions. This library is not responsible for analysis of data between classes.

FEAT_2D_View

This class contains an array of entities (2D) and the coordinate system associated with the view.

FEAT_3D_Model

This class contains an array of features, which make up the model. It also contains a pointer to the base feature and an array of 2D projections (views) associated with the model (if any).

FEAT_Profile

This class contains all the necessary data to draw a profile. Profiles are used in extrusion and revolve features. The fundamental data associated with a profile is an array of polylines, and a coordinate system that indicates where the polyline is to be drawn in space. The profile also contains an array of entities as derived data for use in some CAD systems.

FEAT_BASE

This class is the base class for all 3D features. The fundamental data associated with this class are feature type (i.e. extrusion, hole, fillet, etc), volume operation (i.e. cut, join, intersect), and an array of constraints for this feature (see FEAT_Constraint).

FEAT_Extrusion

The fundamental data associated with an extrusion is the lower and upper extrusion profiles, a blind/through indicator, the draft angle, and two bounds (lower and upper) that represent the distances from absolute origin along the normal vector of the profile. The draft angle is measured in radians along the normal from the lower bound to the upper bound.

FEAT_Hole

The hole feature encompasses all types of holes including tapped holes, counterbore holes, and countersink holes. The fundamental data for all holes includes the lower and upper center points, the radius, the blind/through indicator, the drill tip angle, and possibly the taper angle. The depth of the hole is derived from the upper and lower center points. If there is no drill tip or taper angle, these values will be set to zero. A tapped hole flag will indicate the feature is a tapped hole and if this flag is true, the tapped radius and depth will be set as well as an upper/lower indicator. The upper/lower indicator will specify whether the tapped portion begins from the upper or lower center point. Flags will also exist for both counterbore and countersink holes. If the flag is set to true, the remaining data for that type of hole is set. For a counterbore hole, the remaining data is counterbore radius, and counterbore depth which indicates the depth of the countered portion of the hole. For a countersink hole, the remaining data is the countersink radius, and the countersink angle. The countersink angle is the angle between the two tapered lines. Finally, one upper/lower indicator is created for either the counterbore or the countersink.

FEAT_Revolve

The revolve feature contains a revolve profile and data for the revolve axis, revolve start point, and revolve angle. The revolve angle is the angle the profile is revolved around the revolve axis. Revolve direction is based on the right hand. Revolve starts at the revolve profile plane. Validity flags exist for all the data.

FEAT_Fillet

The fillet feature consists of fundamental data for the radius of the fillet and the array of edges that are filleted. Validity flags exist for all the data.

FEAT_Chamfer

The chamfer feature consists of fundamental data for the chamfer distance as well as the vector for each direction from the edge. The chamfer also contains the edge that is to be chamfered. An equal distance flag is derived from the two distances. Validity flags exist for the fundamental data.

FEAT_Polar_Array

The fundamental data associated with a polar array are the array center, the normal vector to the surface where the array is created, the starting vector, the spacing between the arrayed elements (angle), and the number of array elements as well as the pointer to the base feature that is to be arrayed. The elements will be created in the direction specified by the right-hand rule using the normal vector. Validity flags exist for the fundamental data.

FEAT_Rectangular_Array

The fundamental data associated with the rectangular array are direction vectors, count, and spacing in both directions (i.e. horizontal and vertical), as well as the pointer to the base feature that is to be arrayed. Validity flags exist for the fundamental data.

FEAT_Constraint_Object

The constraint object represents the object to which the feature is constrained. The constraint object can be either a 3D point or a 3D edge. Therefore the fundamental data associated with this class is an enumerated constraint type and two pointers—one for the 3D point and one for the 3D edge. These pointers are mutually exclusive and the set pointer must coordinate with the constraint type. The remaining point must be null.

FEAT_Constraint

This class represents an actual constraint associated with a feature. A feature can have multiple constraints (see FEAT_Base above). The constraint class consists of an enumerated constraint type. This will allow for the continuous development of feature constraints. The class will also contain pointers to up to two constraint objects and a dimension value.

Geometry Network Library

The geometry network library will be the foundation for analysis of all two-dimensional drawings. This library will generate a nodal network of the drawing that will allow for more efficient analysis by the various applications. This will eliminate duplicate code in many instances. The library will consists of classes for intersecting pairs, nodes, clusters, loops, and views. Filter classes will exists to allow the applications to search for data that meets the desired criteria. The filter classes are intersecting pair filter, node filter, and entity filter. The data for each class is protected and must be accessed by the member functions.

NET2D_Intersecting_Pair

The intersecting pair is essentially two connecting entities and the xy-coordinate at which they connect. This is the lowest level of the geometry network. This class keeps track of the relationship between the entities via its data. The intersecting pair data consists of the point, addresses of the two entities, and a connection indicator for each entity representing whether the entity connects at its start point or its end point ('s' or 'e'). The class also contains data for analysis. Examples of this type of data are angles and direction angles for each entity (see GE2D_Arc or GE2D_Line), angle between entities (angle 1 to 2 and angle 2 to 1), direction angles between entities, and comparison flags (i.e. tangential, and point projects vertically or horizontally). Each intersecting pair also contains pointers to the node that shares the pairs' coordinate (See NET2D_Node) as well as the nodes that are reached by traversing each of the two entities. Public member functions exist to retrieve the data for analysis. Data can only be set during the creation of the intersecting pair via private member functions. This maintains the validity of the data.

NET2D_Node

A node represents an xy-coordinate point and all the entities and intersecting pairs that connect to this point. The data associated with this class is the point, an array intersecting pair pointers, and array of entity pointers, and the count associated with each array. Each node also contains a pointer to the cluster that contains the node (See NET2D_Cluster). A trivial flag exists that indicates that the node contains one intersecting pair and two entities when set to true. Public member functions to retrieve the data and to find specific intersecting pairs based on desired criteria set in filter (See NET2D_Intersecting_Pair_Filter).

NET2D_Cluster

A cluster represents all the interconnected data. In other words, every node within the cluster can be reached from every other node by traversing through some path. The use of clusters will generally reduce search times by reducing the number of objects (i.e. entities, nodes, etc) within the search. The data associated with this class is the entities and nodes and the number of each, a bounding box for the cluster representing the lower left hand corner and the upper right hand corner of the cluster, and pointers to the outer boundary loop (NET2D_Loop) and views (NET2D_View) associated with this cluster. Public member functions exist to retrieve the data and to find specific entities or nodes based on desired criteria set in filter (See NET2D_Entity_Filter or NET2D_Node_Filter).

NET2D_Loop

This class represents a single-path closed loop. The loop has multiple uses in the existing 2D to 3D conversions, therefore, basic loop analysis is handled by this class as well as maintaining the data. The data associated with this class consists of arrays of entities, intersecting pairs, horizontal and vertical axis projections. A bounding box represents the lower left hand corner and upper right hand corner of the loop. The loop also contains pointers to the cluster and view to which it belongs. Finally the loop contains various pointers that represent loop relationships. Parent and child loops represent those loops immediately surrounding (parent) or surrounded by (child) this loop. There will be at most a single parent loop but possibly multiple child loops or there may be no parent or child associated with the loop. Other arrays represent all the loops surrounding (ancestor loops) or surrounded by (descendent loops) this loop. Processing associated with this loop consists of algorithms for analyzing the relationship of this loop to another loop. Loops may be related numerous ways. One loop may be inside or outside of another. Two loops may share an edge or two loops may share just points NET2D_View A view represents a related set of intersecting pairs, nodes, filters, and loops. This class is used to represent an original input drawing as well as the orthographic views of the original drawing. The data associated with this class is the entities (in various forms such as original entities, broken entities, free-floating entities, dangling entities), arrays of intersecting pairs, nodes, and clusters, arrays of horizontal and vertical axis projections, and the bounding box of the view. The class also point to the related nodal classes such as the outer boundary loop, the nested boundaries, and the orthographic views (for an original input drawing that has had its views split). General data includes a network complete flag, the orientation of the views, and the number of views. Member functions for this class include reading the data from a file, processing the raw data and building the network from the array of entities. Public member functions also exist to retrieve the data and to find specific entities or nodes based on desired criteria set in filter (See NET2D_Entity_Filter or NET2D_Node_Filter).

NET2D_Intersecting_Pair_Filter

The intersecting pair filter is used to extract an array of intersecting pairs from a node. The desired filter data is set via member functions and the filter becomes an input to the node find function. Some of the desired data for intersecting pair searches include lines or arc only, horizontal and/or vertical axis projections, entities tangential at point, or max or min angle. If a search includes a specific entity, the contains_entity pointer variable is set via a member function. After a search is complete, the filter needs to be reset if it is to be used in another search.

NET2D_Node_Filter

The node filter is used to extract an array of nodes from a cluster or view. The desired filter data is set via member functions and the filter becomes an input to the cluster or view find function. Some of the desired data for node searches include a trivial node flag, x- and y-coordinate values and search conditions associated with each. If a search includes a specific entity, the contains_entity pointer variable is set via a member function. After a search is complete, the filter needs to be reset if it is to be used in another search.

NET2D_Entity_Filter

The entity filter is used to extract an array of entities from a cluster or view. The desired filter data is set via member functions and the filter becomes an input to the cluster or view find function. Some of the desired data for entity searches include horizontal, vertical or angles entities, entity type (lines, arcs, or circles), and specific coordinates (x- or y- on entity or x- or y- as center point for arcs/circles). After a search is complete, the filter needs to be reset if it is to be used in another search.

APPENDIX B

GS Specifications

Introduction. Imagecom GS consist of multiple CAD-based applications including 2½-D editing and 3D-to-3D CAD exchanges. Since similar algorithms exist across multiple applications, libraries of related classes, their attributes and the methods (operations) that are performed on these classes will be developed.

Reusable Libraries. From the initial product line (2D to 3D conversions), we know that the basic data consists of entities (i.e. points, vectors, lines, circles, arcs, and polylines) in 2- and 3-dimensions as well as coordinate system information. This basic data will be grouped together in a "Geometry" library. The resulting CAD model is a 3D Model consisting a combination of 3D features. These features vary across CAD systems with certain basic features being found in virtually all CAD systems. These 3D features, their attributes and methods, will be assembled to create the "Features" library. The foundation of this library must be well defined to allow for the inclusion of additional features from future CAD systems. These two libraries "Geometry" and "Features" are the lowest level of data abstraction. They will be utilized in virtually every Imagecom product and are of utmost importance.

The third most important library is the "Geometry Network" library. The 2D drawing can be described similar to a nodal network. The relationships between various networks classes can then be easily extracted without duplicate or similar algorithms being written. The nodal network functions associated with each class will be designed to handle the difference algorithms in the 2D to 3D conversions. The Geometry Network will consist of classes for Intersecting Pairs, Nodes, Clusters, Loops, and Views. Filter classes can be used to extract the desired data from the View, Cluster, or Node. Loop relationship functions will handle all possible relationships between two closed loops.

The remaining libraries will be an extraction and expansion of common algorithms from the initial product (FlexiDesign). These will be converted to object-oriented classes, with their attributes and functions. General mathematical algorithms will be incorporated into a "Geometry Tools" library. AutoCAD functions to read entities from or write entities to the AutoCAD database will be incorporated into an "AutoCAD Tools" library. All interfaces to outside devices will be incorporated into an "Interface" library. Other libraries may be created as needed as development progresses.

Product Applications

After the libraries have been completed, future applications can be written. In the initial phase of development, two applications will be created. The first will be a Mechanical Desktop Interface application. It will consist of creating a Mechanical Desktop 3D model from the 3D model defined in the feature library. This will be referred to as the "Read" function since the model is being read from the features library. Concurrently, the Mechanical Desktop 3D model will be converted to the feature library 3D model (referred to as the "Write" function).

The second application will be a 2½-D editor that will allow editing of the 3D model created in FlexiDesign. This application consists of four stages. These stages are
1. Reading the file and displaying the 3D model in AutoCAD in 2D
2. Verifying and writing the updated 2½-D model to the file
3. Editing the 2½-D Model
The first two steps will be done in parallel. At the same time the FlexiDesign features will be converted to the appropriate feature class, adding them to the 3D model representation from the 'features' library, and writing this model to a file. The actual editing of the model is, in itself, a major part of the application.

APPENDIX C

Interactive FlexiDesign

Interactive FlexiDesign (iPlus) is an application to perform 2D to 3D conversions that will allow the user control in the creation of the 3D model. This interactive process will actually be a combination of the automated software (G1) and user controls. The initial FlexiDesign G1 document ("FlexiDesign G1", December 2002) shows the breakdown of the automated software into three distinct processes: Feature Detection, Feature Analysis, and Model Build. If the features selected are incorrect, or if one or more features are missed during the extraction process, the 3D model cannot be correctly created. For this reason, the initial stage of Interactive FlexiDesign, will concentrate on the Feature Detection step of the 2D to 3D conversion process. In iPlus, the feature detection stage can be fully automated (FDG1), fully manual, or a combination of automated/manual. iPlus will represent a separate path within the FlexiDesign G1 software but will not be developed as a separate application. This path can be linked in conditionally. In this manner, only one application will need to be maintained. The initial development of iPlus will require that various tools be created that enable the user to make selections via the desired CAD system. These tools will be developed as library tools within FlexiDesign GS ("Imagecom GS Object Oriented Analysis", December 2001). The following sections will describe the sequence of events within G1 to allow the user to select the desired features followed by a description of the CAD tools and how they will be used within G1. Sample dialog boxes for each stage of the manual feature selection steps (both fully and partially manual) are shown in the figures below.

Feature Selection

Figure 4:
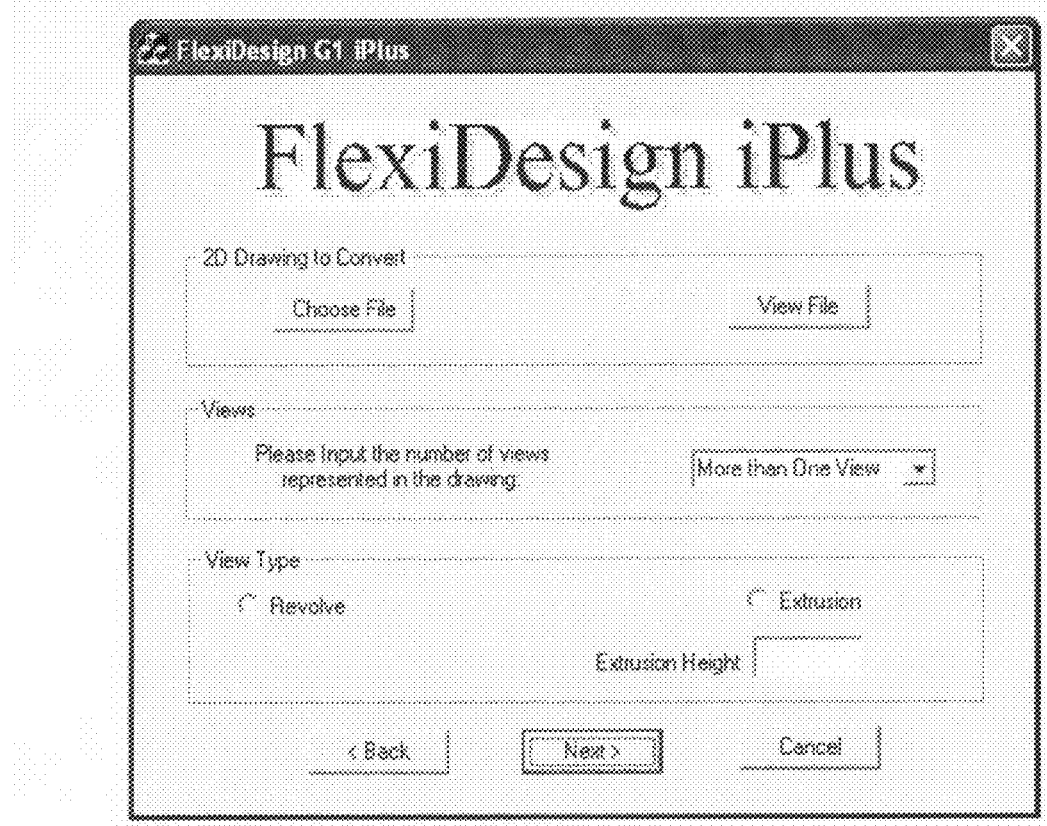
FIG. 4 depicts a sample initial dialog box in accordance with an exemplary embodiment of the present invention.
Figure 5:
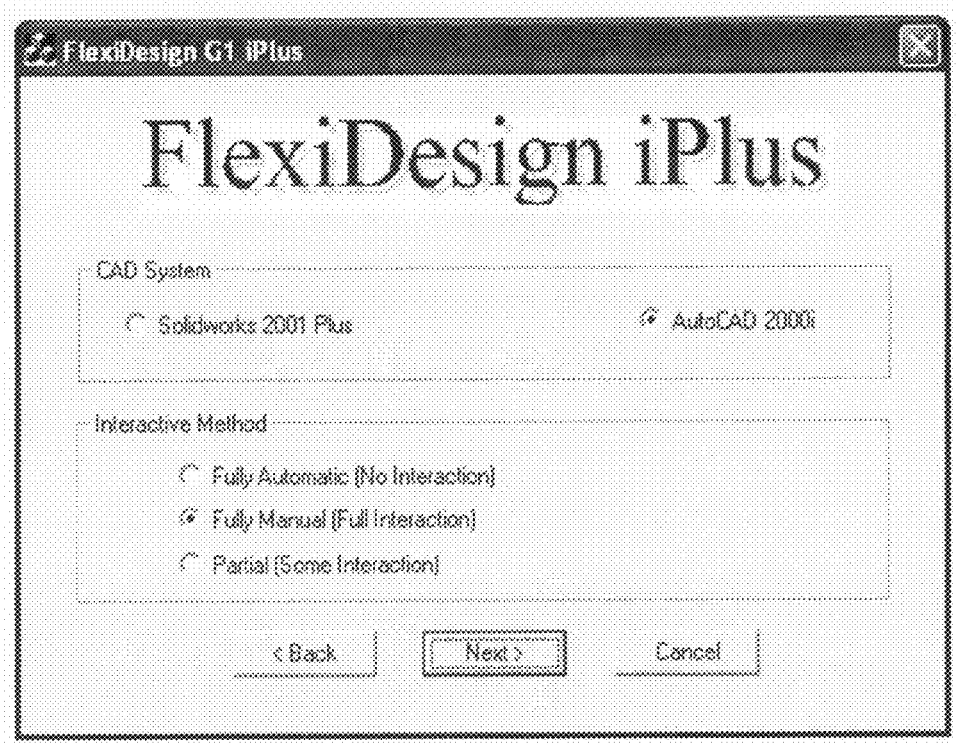
FIG. 5 depicts a sample control dialog box for selecting a CAD system interface and degree of user interaction in accordance with an exemplary embodiment of the present invention.

The FDG1 iPlus software is implemented as a series of property sheets. The initial dialog box for iPlus is unchanged from G1. The user must still select the desired file, the number of views, and the view type. This dialog box is shown in FIG. 4. However, iPlus will diverge from G1 after the initial dialog box. An intermediary dialog box will request the user to select the CAD system to use for the visualization and selection process and the desired amount of user interaction. FIG. 5 shows a sample dialog box for this. Initial development will concentrate on SolidWorks 2001 Plus and AutoCAD 2002 as the CAD tools. Once a CAD system has been selected, the appropriate DLL opens the chosen CAD system or displays an error message if necessary.

Figure 6:
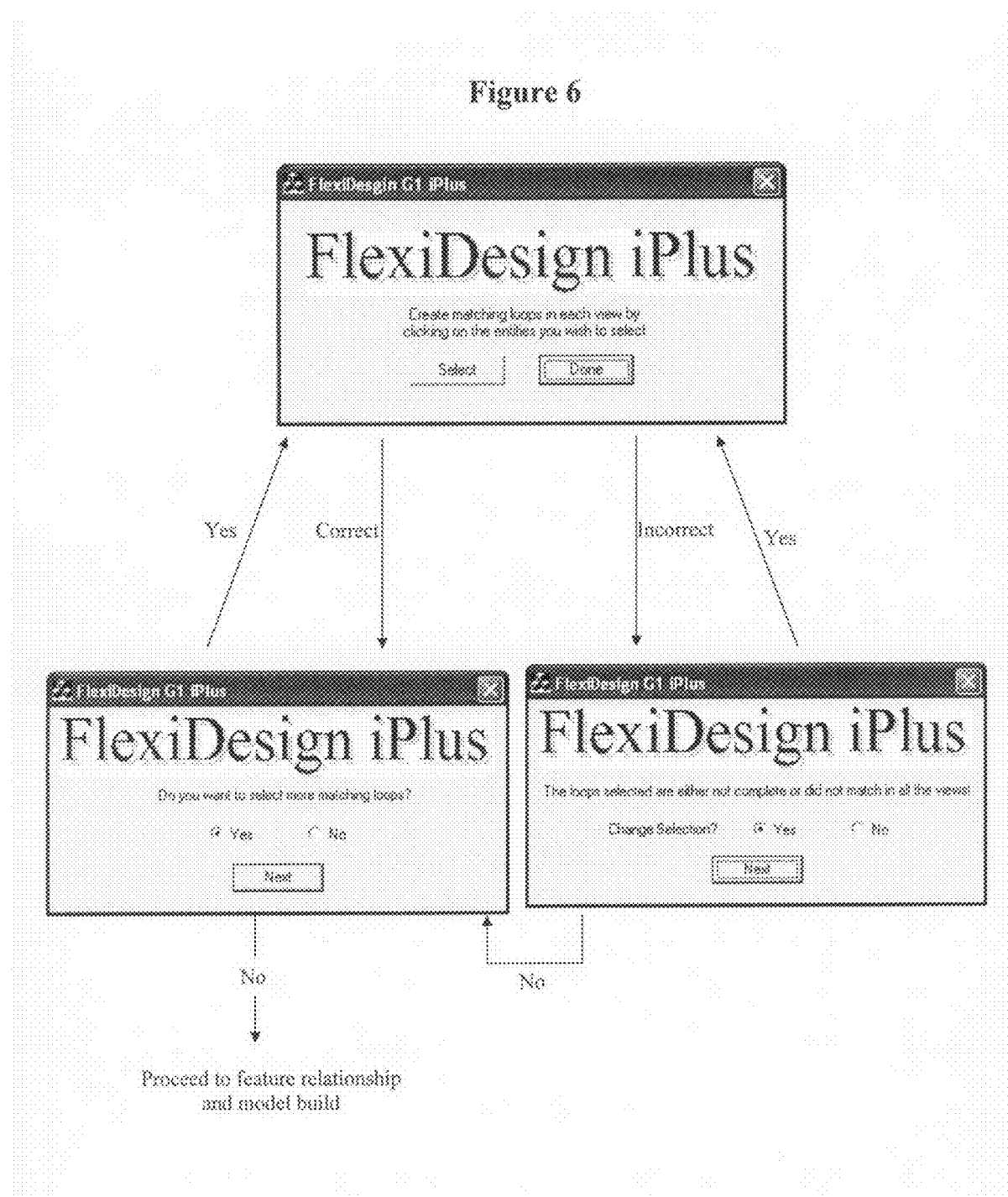
FIG. 6 depicts sample dialog boxes and selection screens showing fully manual feature selection sequencing in a flow chart in accordance with an exemplary embodiment of the present invention.

If the user has selected the fully manual approach, a manual loop selection dialog will contain a button allowing the user to select the entities and a second that the user may select when the matching loop selection process is complete. Once a feature selection has been made, the software will validate the loops for a valid feature. Validation will consist of checking for complete, closed loops as well as verifying matched boundaries within the selected loops. If the selected loops do not pass the validation process, the user will be prompted to either correct the loops or cancel the selection. Once the matched loops are validated, these loops will be added to the array of feature loops (see FDG1), and the next dialog sequence will ask the user if more feature selection is needed, or if this step is complete. The process will be repeated until the user has indicated that no further selection is necessary at which point the remaining FDG1 steps (feature analysis and model build) will continue. This fully manual process, complete with sample dialog boxes, is depicted in FIG. 6.

Figure 7:
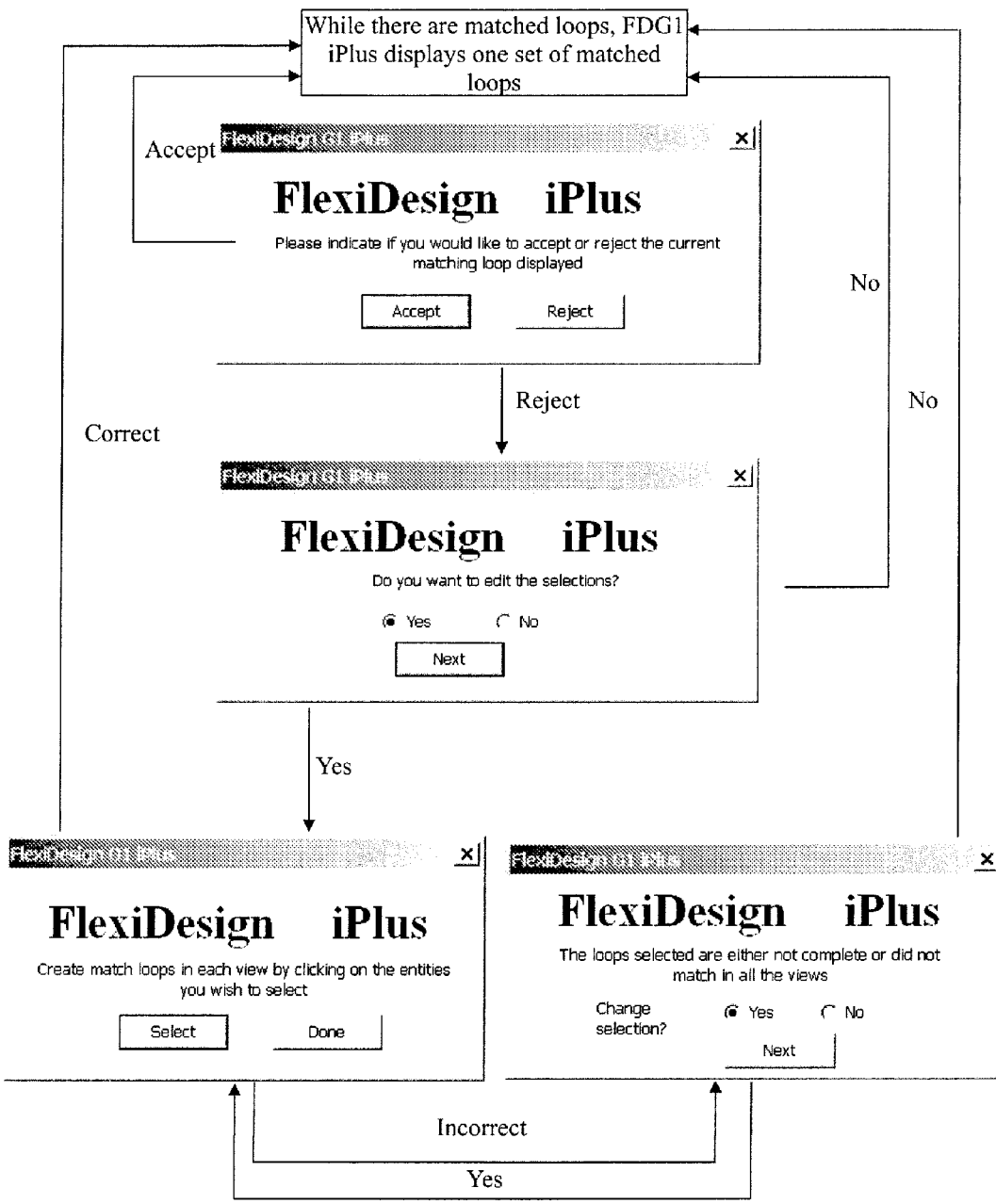
FIG. 7 depicts sample dialog boxes and selection screens showing partial interaction feature selection sequencing in a flow chart in accordance with an exemplary embodiment of the present invention.

If partially automated, the FDG1 software will perform the feature detection algorithms as usual. Once all possible features have been automatically detected, the iPlus software will display a selection screen containing radio buttons that allows the user to accept or reject the matching loops displayed by the software. The software will display each set of matched loops until the user has accepted or rejected each feature. If at any point the user rejects a feature, the software will ask if the user desires to edit the matching loops generated by the software. If the user does not wish to edit the feature's loops, the software continues to the next set of matched loops. If the user wants to edit the loops, the software will continue in manual selection mode via the manual loop selection screen with the Select and Done buttons. As in the manual mode, the software will validate the selected matched loops and indicate any errors to the user. This semi-automated sequence complete with sample dialog boxes is depicted in FIG. 7.

iPlus software sequences. The outline of the feature selection process sequence for iPlus software is given below:
1. After the user is done selecting the DXF file that needs to be converted into 3D, the FDG1 iPlus software asks in which CAD system (right now ACAD and SWX) he/she wants to view the file. If the appropriate DLL is available, it opens up the chosen CAD system or displays the appropriate error message if any.
2. The next screen of FDG1 iPlus asks the user if he/she wants to automate (partially interactive) the loop matching or do it manually (totally interactive).
3. If manual,
   3.1. The manual loop selection screen has a button that allows users to select one entity at a time and another to tell the software that he/she is done with selecting matching loops in each view.
   3.2. The software then validates the user's selection against the following:
      The loops selected in each view are complete
      The loops in all the views are indeed matching
   3.3. The software then displays the validation status in a dialog box. If validation is successful, FDG1 iPlus asks the user if he/she wants to select more matching loops; otherwise, if validation fails, it asks the user if he/she wants to change the selections or skip the step.
   3.4. Steps 3.1 to 3.3 are repeated until the user has more loops to select.
4. If automatic,
   4.1. The manual loop selection screen has radio buttons that allow the user to accept or reject the matching loops displayed by the software.
   4.2. The software displays the next set of matching loops in all views.
   4.3. If user clicks on reject, then the software asks the user if he/she wants to edit the matching loops generated by the software. If the user does not want to edit, control goes to 4.2. If the user wants to edit the loops, the software displays the manual loop selection screen with the Select and Done buttons.
      4.3.1. The software then validates the user's selection against the following:
         The loops selected in each view are complete
         The loops in all the views are indeed matching
      4.3.2. The software then displays the validation status in a dialog box. If validation is successful, control goes to 4.2; otherwise, if validation fails, the software asks the user if he/she wants to change the selections or skip the step.
   4.4. Steps 4.2 and 4.3 are repeated till there are more matching loops to display.

The entire content of each of the documents listed below is hereby incorporated by reference:
1) Leewen Tyan and V. Devarajan, "Automatic Identification of Non-intersecting Machining Features From 2D CAD input", *CAD*. Vol. 30, No. 5, pp. 357-366, 1998.
2) R. Ganesan and Venkat Devarajan, "Intersecting Features Extraction from Orthographic Projections", *CAD* Vol. 30, No. 11, pp. 863-873, 1998.
3) R. Ganesan and V. Devarajan, "A feature-based framework for transforming and representing multiple format CAD for virtual prototyping", *Virtual Environments and the Product Development Process*. Editor(s): Rix, Haas and Teixeira, Chapman and Hall, 1995 pp. 129-145.
4) R. Ganesan and V. Devarajan, "The Flexicad Architecture For Integrated Product Modeling And Manufacture By Features", Proc. of 4th. *Intl. Con. on CIM and Automation Tech.*, pp. 234-240, New York, 1994.
5) V. Sundaramurthy and V. Devarajan, "Reconstruction of 3-D CAD models from 2-D orthographic CAD views", *Intl. Con. on CAD/CAM, Robotics and Autonomous Factories, N. Delhi*, pp. 71-80, 1993.
6) Srividya Viswanathan, MS Thesis, UT Arlington, December 1998 "Protrusion and Depression Detection from 2D CAD Inputs"
7) Satish Kumar, MS Thesis, UT Arlington, December, 1995, "Design of a Hierarchical Object-oriented Feature Library"
8) Jengpang Peng, PhD Dissertation, December 2000 "Extraction of Semantic Information from 2D CAD drawings."

What is claimed is:

1. A method for converting a two-dimensional drawing to a complete three-dimensional model, as an output that is readable and editable in a 3-D computer-aided-design ("CAD") software system, comprising:
   (a) inputting the two-dimensional drawing;
   (b) correcting errors associated with the two-dimensional drawing to give a corrected two dimensional drawing;
   (c) using an automated feature detection system to create matched feature loops;
   (d) performing a profile analysis and a feature analysis on the matched feature loops;
   (e) producing an ordered list of three-dimensional features using geometry of up to six orthographic views of the three-dimensional features, wherein the ordered list of three-dimensional features is ordered consistently with the CAD system's ordering expectations;
   (f) writing the ordered list of three-dimensional features to an intermediate binary file format;
   (g) interfacing the binary file format to a binary file format that is specific for the CAD system; and (h) producing a parametric feature-based three-dimensional model wherein step (d) comprises:

receiving the matched feature loops, performing a profile analysis on each loop match, building feature subtrees, wherein each of the feature subtrees contains necessary data to create a 3-D feature, setting a relative volume operation for each of the feature subtrees, and building feature relations on the feature subtrees; and step (e) comprises:

building a model tree based on the feature relations, and producing a final feature tree based on the model tree to give the ordered list of three dimensional features.

2. The method of claim 1 further comprising back projecting the three-dimensional model to obtain drawing views associated with a three-dimensional model for the purpose of validating the three-dimensional model against the two-dimensional drawing.

3. The method of claim 2 further comprising overlaying the drawing views on top of the two-dimensional drawing views.

4. The method of claim 3 further comprising comparing the views.

5. The method of claim 1, wherein:

step (a) comprises:

automatically filtering non-graphical entities, wherein the non-graphical entities include all dimension lines, centerlines, construction lines, hatching, text, title blocks, and borders, and exploding any blocks in the drawing to accumulate indivisible geometric entities; and step (b) comprises:

performing error checking on the drawing, if errors are found, correcting the errors, and automatically splitting entities in the drawing or in the corrected drawing corresponding to top, front and side views.

6. The method of claim 5 further comprising fixing a common origin for each view.

7. The method of claim 6 further comprising translating the entities to the common origin.

8. The method of claim 7 further comprising writing translated geometric entity data to classes.

9. The method of claim 1, wherein step (c) comprises:

receiving the corrected two-dimensional drawing;

performing a subpart extraction of the corrected two dimensional drawing, wherein the subparts are join features including single features or combinations of features and wherein all subparts are extracted;

performing a subpart matching of the corrected two dimensional drawing;

extracting nested loops and circular loops;

matching the nested loops and circular loops; and producing matched feature loops.

* * * * *